(12) United States Patent
Harutyunyan et al.

(10) Patent No.: US 12,009,965 B2
(45) Date of Patent: Jun. 11, 2024

(54) METHODS AND SYSTEMS FOR DISCOVERING INCIDENTS THROUGH CLUSTERING OF ALERT OCCURRING IN A DATA CENTER

(71) Applicant: VMware LLC, Palo Alto, CA (US)

(72) Inventors: Ashot Nshan Harutyunyan, Yerevan (AM); Arnak Poghosyan, Yerevan (AM); Naira Movses Grigoryan, Yerevan (AM); Artur Grigoryan, Yerevan (AM); Tigran Bunarjyan, Yerevan (AM); Karen Aghajanyan, Yerevan (AM); Vahan Tadevosyan, Yerevan (AM); Tigran Avagimyants, Yerevan (AM)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/867,353

(22) Filed: Jul. 18, 2022

(65) Prior Publication Data
US 2024/0022466 A1    Jan. 18, 2024

(51) Int. Cl.
| | | |
|---|---|---|
| *H04L 12/00* | (2006.01) | |
| *G06F 7/08* | (2006.01) | |
| *G06F 9/451* | (2018.01) | |
| *G06F 16/28* | (2019.01) | |
| *H04L 41/0604* | (2022.01) | |
| *H04L 41/0631* | (2022.01) | |
| *H04L 41/22* | (2022.01) | |

(52) U.S. Cl.
CPC ............ *H04L 41/0609* (2013.01); *G06F 7/08* (2013.01); *G06F 9/451* (2018.02); *G06F 16/285* (2019.01); *H04L 41/065* (2013.01); *H04L 41/22* (2013.01)

(58) Field of Classification Search
CPC ... H04L 41/0609; H04L 41/065; H04L 41/22; G06F 7/08; G06F 9/451; G06F 16/285
USPC .................................................. 709/223–225
See application file for complete search history.

(56) References Cited

U.S. PATENT DOCUMENTS

| | | | |
|---|---|---|---|
| 9,215,217 B2* | 12/2015 | Abu-Hakima | H04W 4/02 |
| 10,365,915 B2* | 7/2019 | Vora | H04L 41/12 |
| 10,547,693 B2* | 1/2020 | Marlatt | H04L 67/12 |
| 11,106,388 B2* | 8/2021 | Batra | H04L 41/0893 |
| 11,513,935 B2* | 11/2022 | Przestrzelski | G06F 11/3086 |
| 2015/0081882 A1* | 3/2015 | Bartucca | G06F 9/5027 |
| | | | 709/224 |

(Continued)

*Primary Examiner* — Frantz Coby
(74) *Attorney, Agent, or Firm* — Quarles & Brady LLP

(57) ABSTRACT

Automated computer-implemented methods and systems for discovering clusters of alerts triggered by abnormal events occurring with objects in a data center are described. In one aspect, alerts with start times in a sliding run-time window are retrieved from an alerts database. Each alert corresponds to a run-time event occurring with an object of the data center. Clusters of alerts in the sliding run-time window are detected based on the start times of the alerts and topological proximity of the objects. High priority alerts in the clusters of alerts are determined based on alert types. The events associated with discovered clusters of alerts and high priority alerts are displayed in a graphical user interface ("GUI"). Time evolution clustering of alerts and coverage evolution of alerts are over time based on the start times of the alerts and topological proximity of objects exhibiting abnormal behavior in the data center.

26 Claims, 44 Drawing Sheets

(56) References Cited

U.S. PATENT DOCUMENTS

| | | | |
|---|---|---|---|
| 2016/0197795 A1* | 7/2016 | Keane | H04L 67/5682 |
| | | | 709/224 |
| 2016/0364467 A1* | 12/2016 | Gupta | G06F 16/285 |
| 2018/0183744 A1* | 6/2018 | Yu | H04L 12/1845 |
| 2021/0120043 A1* | 4/2021 | Karpovsky | H04L 63/205 |
| 2023/0004750 A1* | 1/2023 | Wang | G06F 16/90332 |

* cited by examiner 3502   3504

| Grouped By Incidents | | | | |
|---|---|---|---|---|
| > Incident 1 | | | | |
| > Incident 2 | | | | |
| ∨ Incident 3 | | | | |
| Criticality | Alert | Triggered On | Created On | Priority |
| ☐ | Virtual machine has CPU contention due to ... | V10_Mysql... | 12/16/21 2:03 PM | |
| ☐ | Virtual machine has disk I/O latency problem... | V10_Mysql... | 12/16/21 2:03 PM | HIGH |
| ○ | Virtual machine is running on snapshots for... | V10_Mysql... | 12/16/21 1:53 PM | |

| Grouped By Incidents | | | | |
|---|---|---|---|---|
| ∨ Incident 10 | | | | |
| Criticality | Alert | Triggered On | Created On | Priority |
| ☐ | The Distributed Switch configuration is incorrect | VDS.03 | 12/17/21 3:04 PM | |
| ☐ | Host has lost connection to management server | 192.168.1.152 | 12/17/21 3:04 PM | |
| ☐ | Host has lost connection to management server | 192.168.1.171 | 12/17/21 3:04 PM | |

| Grouped By Incidents | | | | |
|---|---|---|---|---|
| > Incident 18 | | | | |
| ∨ Incident 19 | | | | |
| Grouped By Incidents | | | | |
| Criticality | Alert | Triggered On | Created On | Priority |
| ☐ | Virtual machine disk I/O write latency is high | vrops.8.7.0.52 | 12/16/21 2:23 PM | |
| ☐ | Datastore is running out of disk space | DS1-Ptalform | 12/16/21 2:13 PM | |
| ○ | Virtual machine disk I/O write latency is high | vrops.8.7.0.54 | 12/16/21 2:03 PM | HIGH |
| ○ | Virtual machine is running on snapshots for more... | vrops.8.7.0.51 | 12/16/21 1:53 PM | |

METHODS AND SYSTEMS FOR DISCOVERING INCIDENTS THROUGH CLUSTERING OF ALERT OCCURRING IN A DATA CENTER

TECHNICAL FIELD

This disclosure is directed to methods and systems for discovering incidents in a data center.

BACKGROUND

Electronic computing has evolved from primitive, vacuum-tube-based computer systems, initially developed during the 1940s, to modern electronic computing systems in which large numbers of multi-processor computer systems, such as server computers and workstations, are networked together with large-capacity data-storage devices to produce geographically distributed computing systems that provide enormous computational bandwidths and data-storage capacities. These large, distributed computing systems include data centers and are made possible by advancements in virtualization, computer networking, distributed operating systems and applications, data-storage appliances, computer hardware, and software technologies. The number and size of data centers has grown in recent years to meet the increasing demand for information technology ("IT") services, such as running applications for organizations that provide business services, web services, streaming services, and other cloud services to millions of users each day.

Advancements in virtualization and software technologies provide many advantages for development and deployment of applications in data centers. Enterprises, governments, and other organizations now conduct commerce, provide services over the internet, and process large volumes of data using distributed applications executed in data centers. A distributed application comprises multiple software components that are executed in virtual machines ("VMs"), or in containers, on multiple server computers of a data center. The software components communicate and coordinate data processing and data stores to appear as a single coherent application that provides services to end users. As result, data centers run tens of thousands of distributed applications in VMs and containers that can be scaled up or down to meet customer and client demands. For example, VMs that provide a service can be created to satisfy increasing demand for services and deleted when demand for the services decreases, which frees up computing resources. VMs and containers can also be migrated to different host server computers within a data center to optimize use of resources.

Organizations that rely on data centers to run their applications cannot afford performance problems that result in downtime or slow execution of their applications. Such issues frustrate application users, damage a brand name, result in lost revenue, and, in some cases, denying users access to vital services. Data center system administrators are tasked with monitoring thousands of dynamically changing data center objects, such as VMs, containers, server computers, and network devices, for events that create performance problems and take immediate corrective action when problems occur. Operation management tools have been developed to aid system administrators with monitoring data center objects for abnormal behavior. These tools detect events that indicate abnormal behavior of an object and start alerts on a system administrator's consoles to notify system administrators of the abnormal events. When alerts are spaced far apart in time and localized to one or two data center objects, system administrators typically respond with appropriate remedial action. However, typical operations management tools do not include features that aid system administrators with understanding and prioritizing streams of events that originate from various sources and occur in short time periods. Such high-volume events are called an "event storm." Most event storms originate from a multitude of objects and can produce hundreds and in some cases thousands of alerts in a short period of time, such as within minutes to a few hours. A systems administrator or an application owner has no way of knowing from observing numerous alerts if the events behind the alerts are in some way related. Understanding and prioritizing events of an event storm to determine the source, or sources, of the problems and appropriate remedial actions are beyond the capabilities of system administrators. Analysis of event storms are often performed by teams of software engineers long after an event storm. Each team carefully exams events to try and understand how the events are related and prioritize the events for remedial action, which is time consuming, expensive, and error prone. System administrators seek automated processes and systems that aid system administrators with understanding and prioritizing streams of events in real time while objects in a data center are running.

SUMMARY

This disclosure is directed to automated computer-implemented methods and systems for discovering incidents in a data center through clusters of alerts triggered by events in the data center. The methods are executed by an operations manager that runs in the data center. The operations manager gets alerts with start times that lie in a sliding run-time window from an alerts database. Each alert corresponds to a run-time event occurring with an object executing in the data center. The operations manager detects clusters of alerts in the sliding run-time window based on the start times of the alerts and topological proximity of the objects in a data center topological hierarchy. A detected cluster of alerts reveals an otherwise unknown incident in the data center. An incident may be the results of numerous related events. The operations manager also determines high priority alerts in the clusters of alerts based on types of alerts. The events associated with the discovered clusters of alerts and the high priority alerts are displayed by the operations manager in a graphical user interface ("GUI"). The operations manager also performs time evolution clustering of alerts and coverage evolution of alerts over time based on the start times of the alerts and the topological proximity of the objects.

DESCRIPTION OF THE DRAWINGS

FIGS. 35A-35D show examples of graphical user interfaces ("GUIs") that display events associated with different clusters of alerts.

DETAILED DESCRIPTION

This disclosure presents automated computer-implemented methods and systems for discovering incidents through clustering of alerts associated with streams of events occurring in a data center. In a first subsection, computer hardware, complex computational systems, and virtualization are described. Computer-implemented methods and systems for discovering incidents in a data center are described below in a second subsection.

Computer Hardware, Complex Computational Systems, and Virtualization

Figure 1:
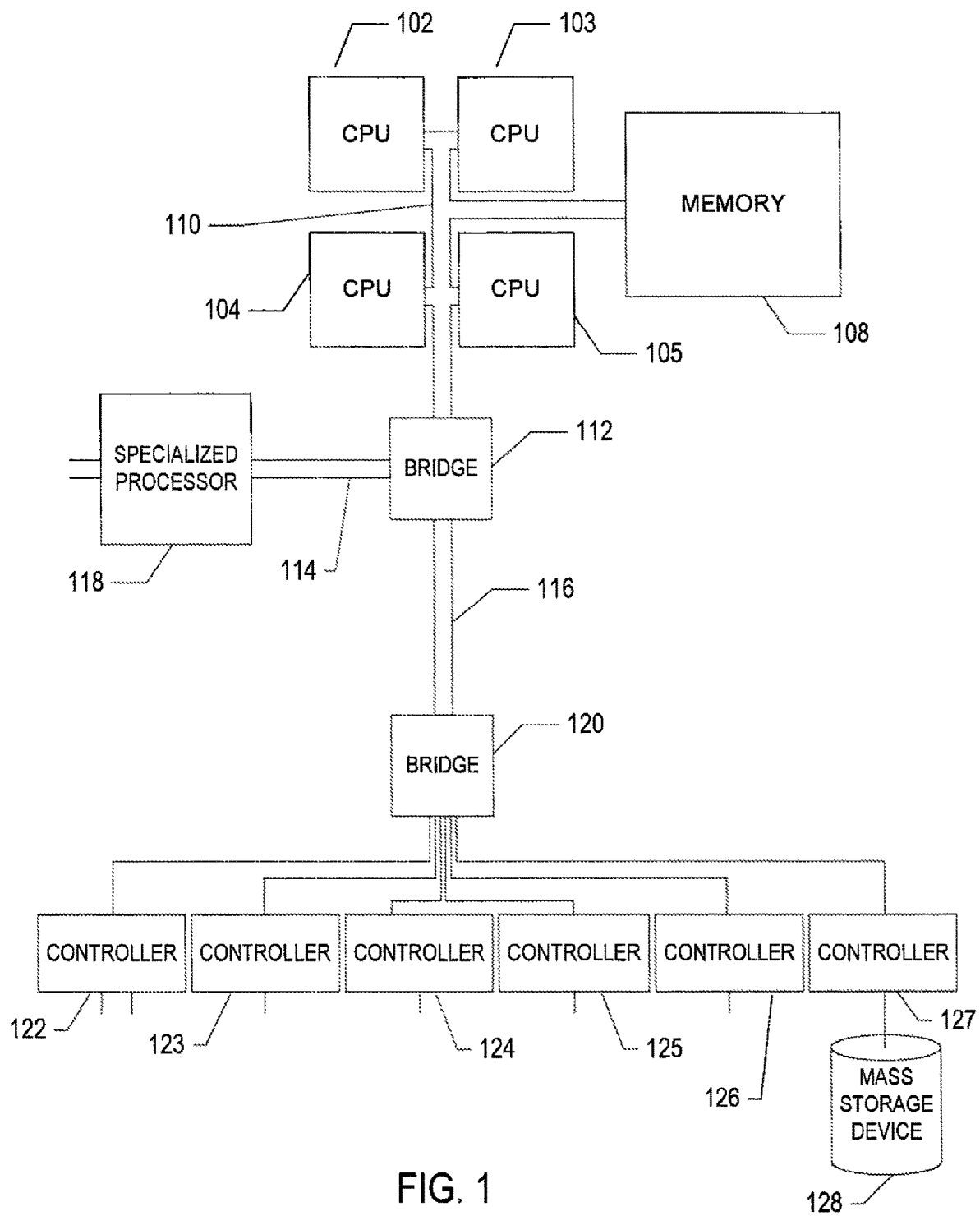
FIG. 1 shows an architectural diagram for various types of computers.

FIG. 1 shows a general architectural diagram for various types of computers. Computers that receive, process, and store log messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
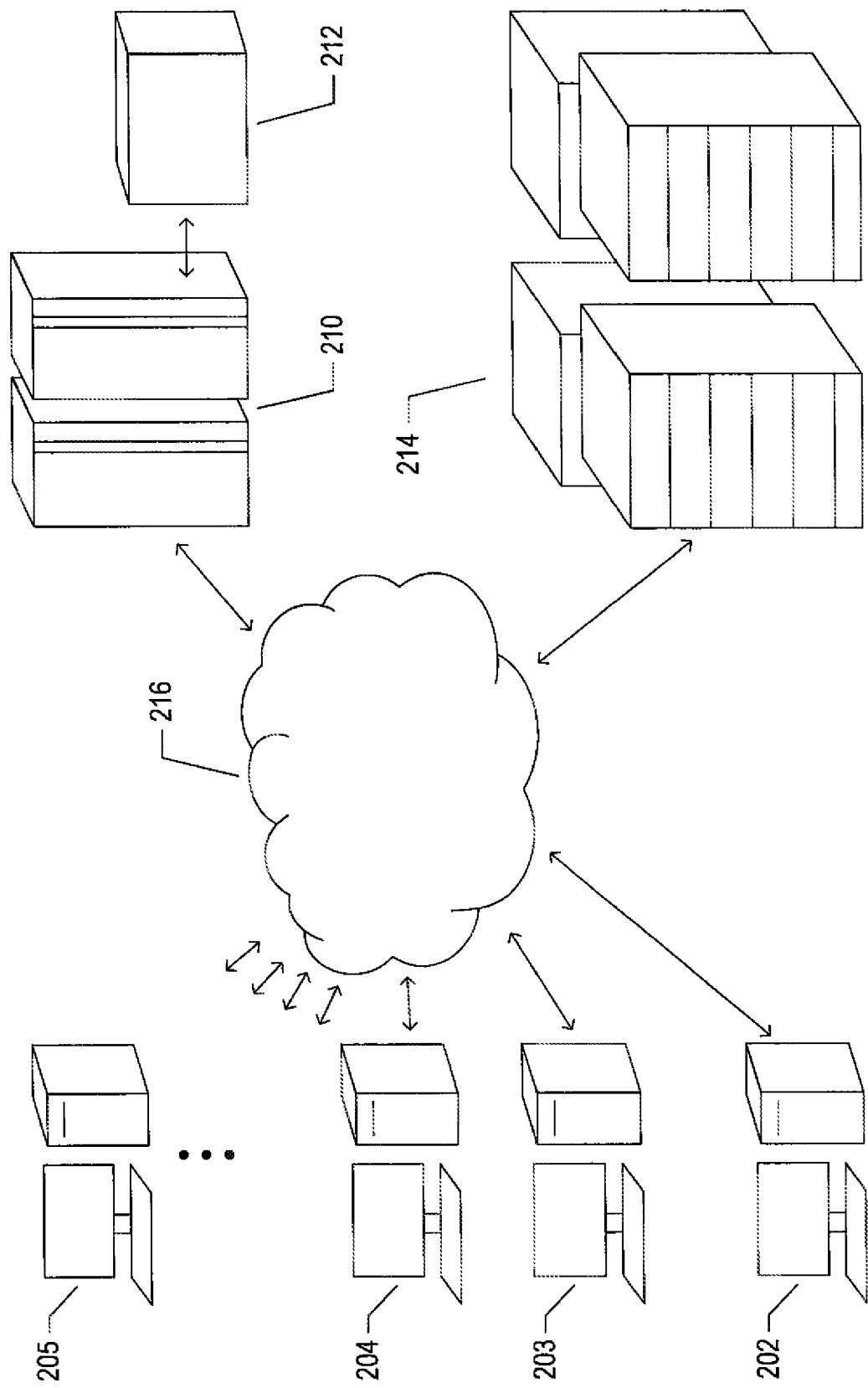
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
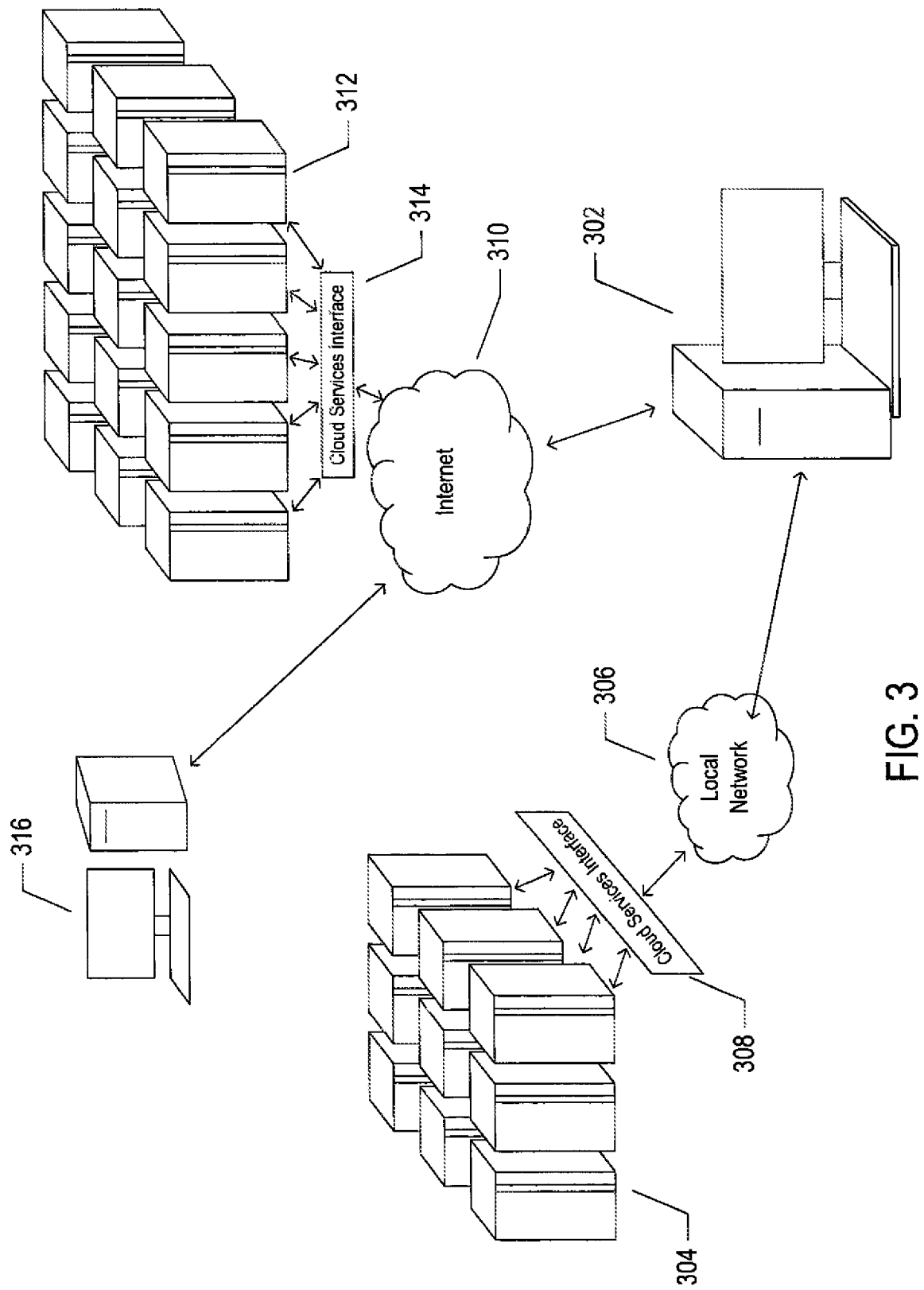
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
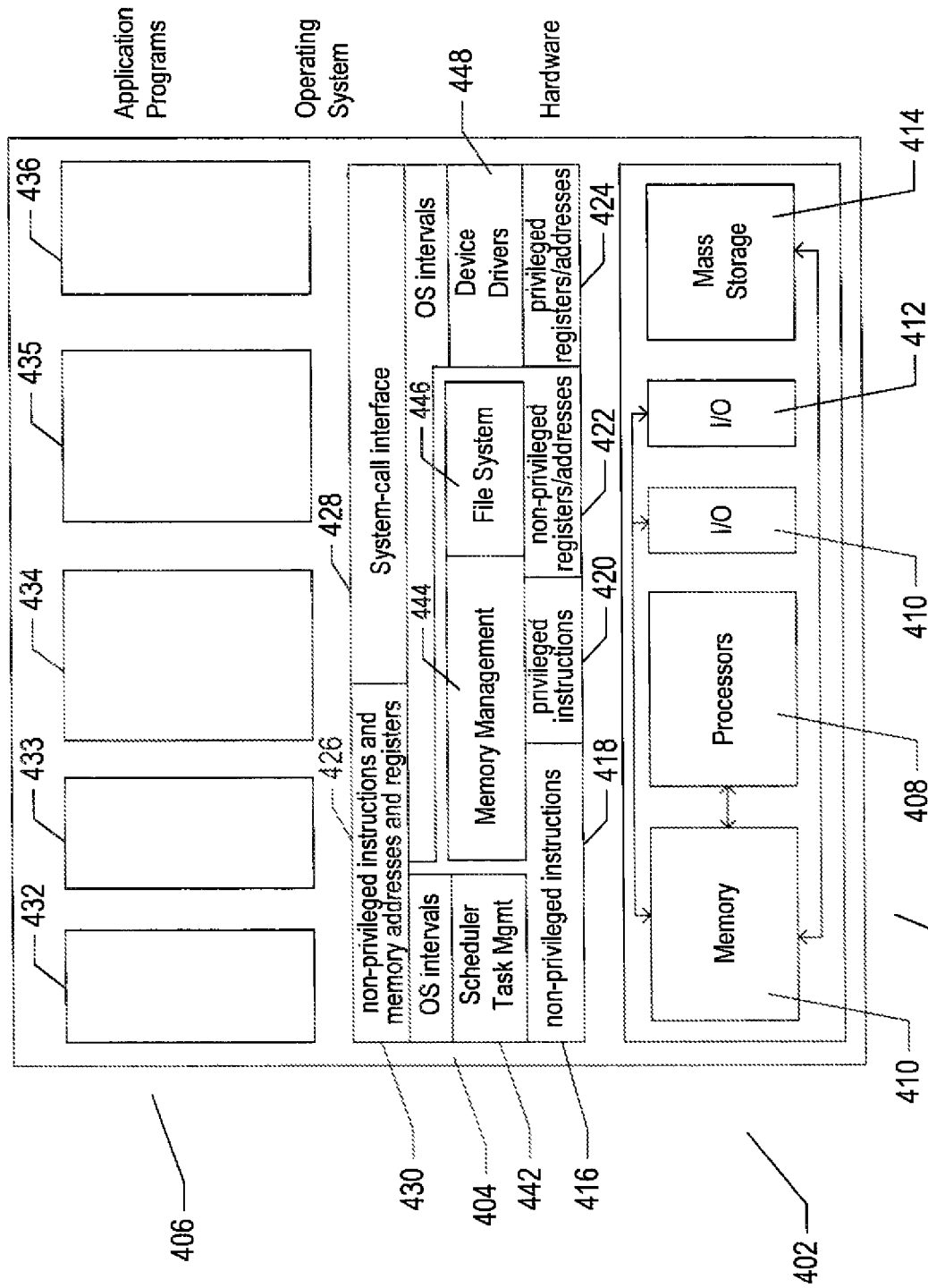
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402: (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems.

Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
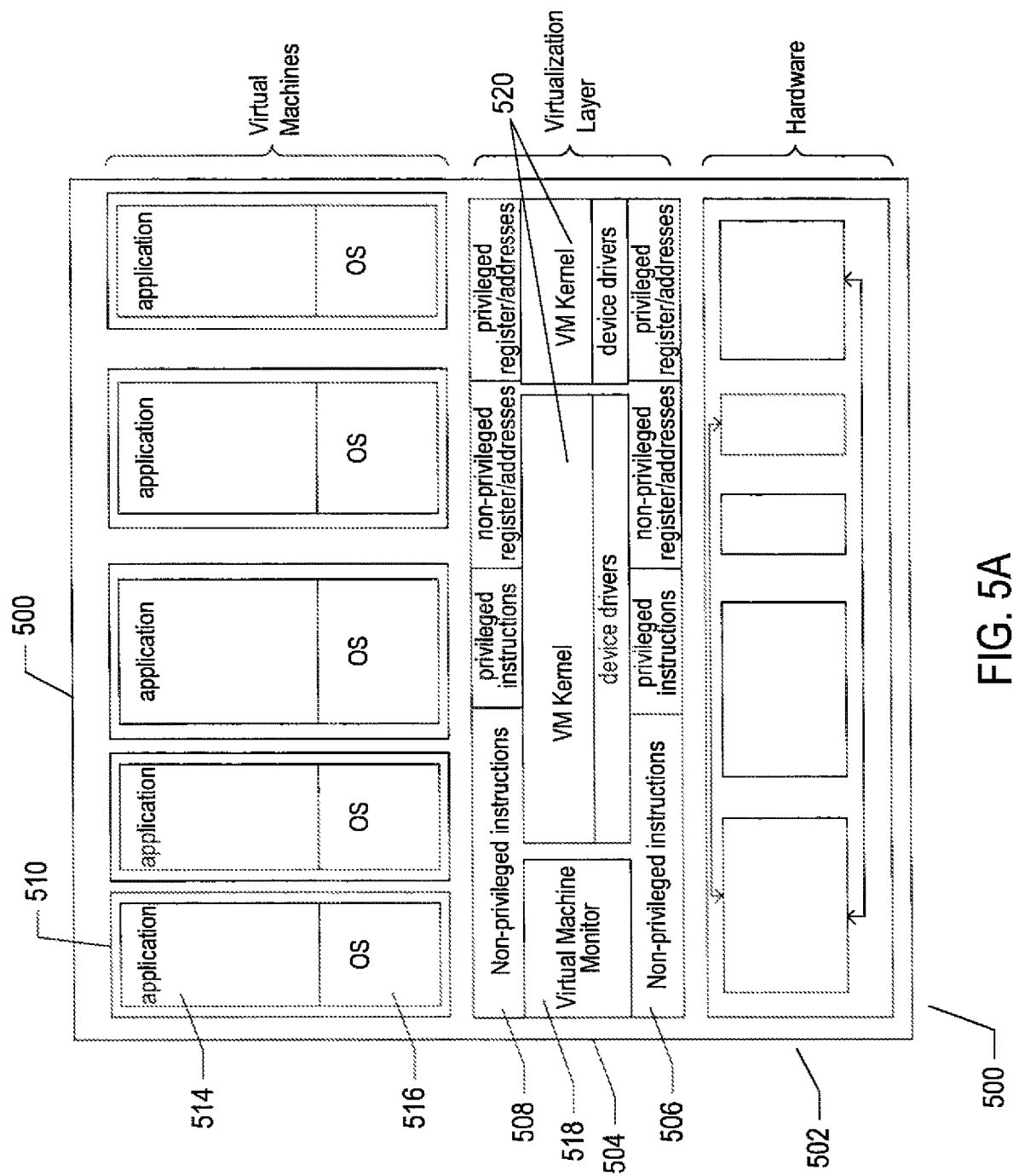
FIGS. 5A-5B show two types of virtual machines ("VMs") and VM execution environments.
Figure 5B:
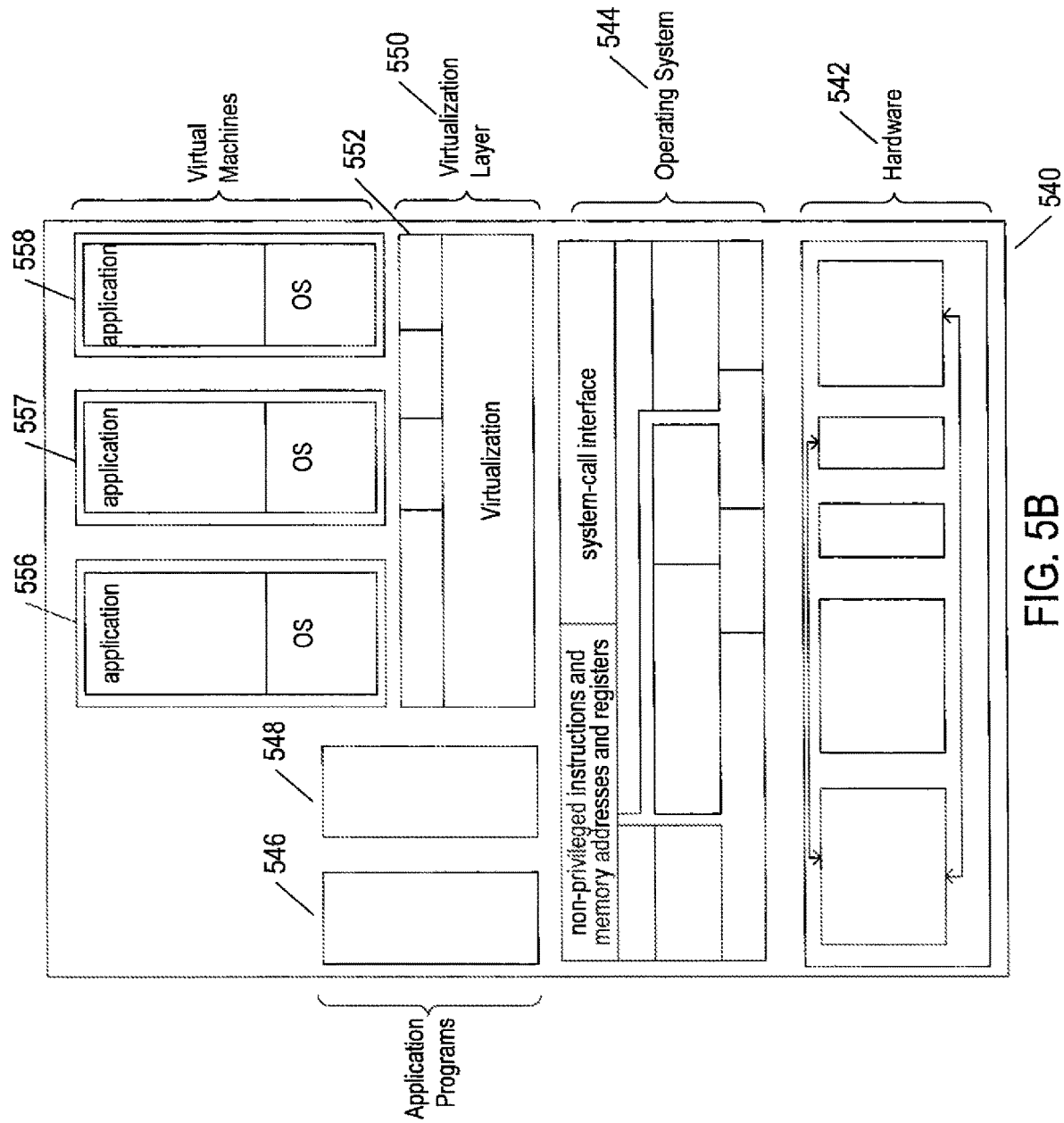

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system." such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. How ever, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In Figures SA-5B, the layers are somewhat simplified for clarity of illustration. For example, portions of the virtualization layer 550 may reside within the host-operatingsystem kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
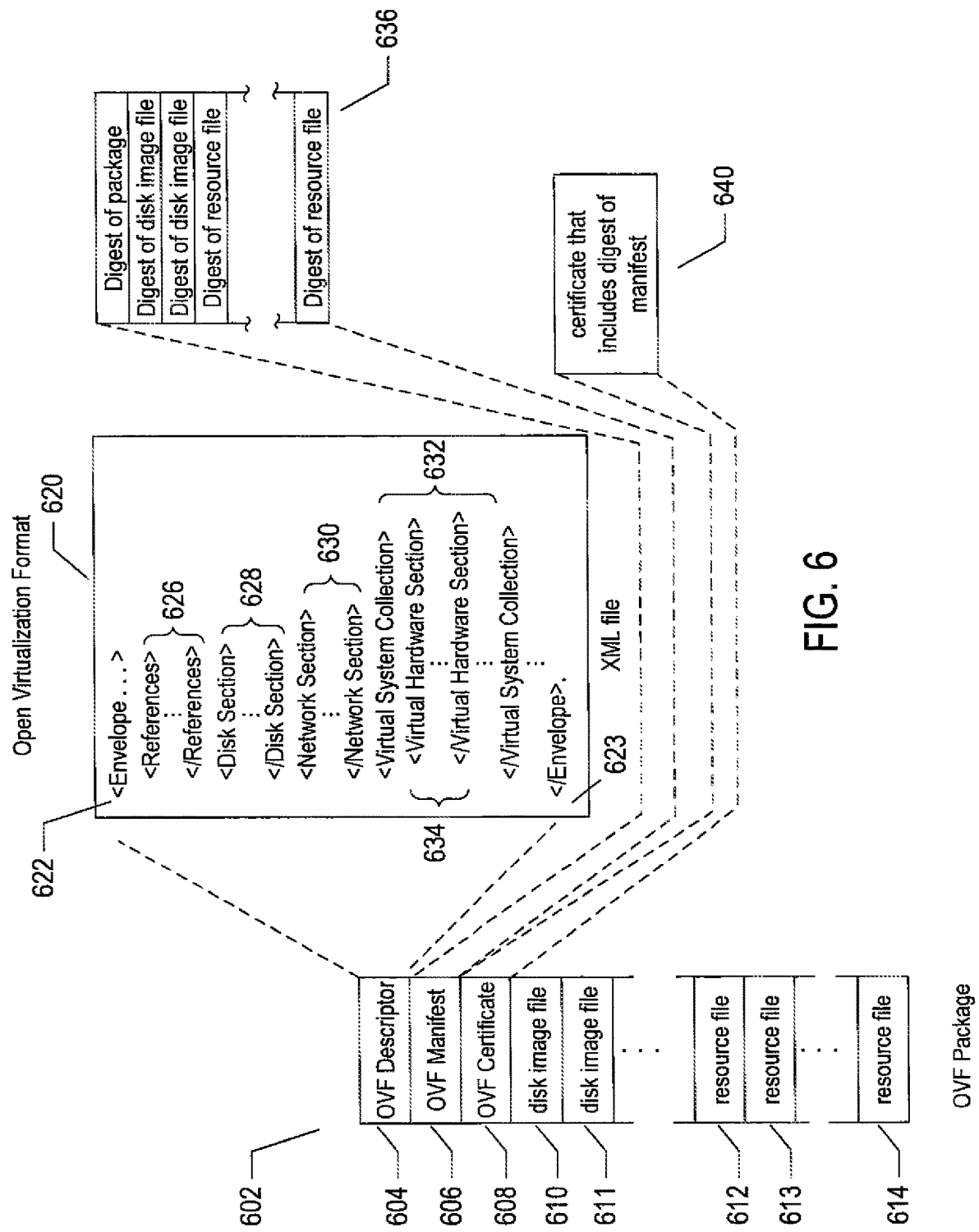
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
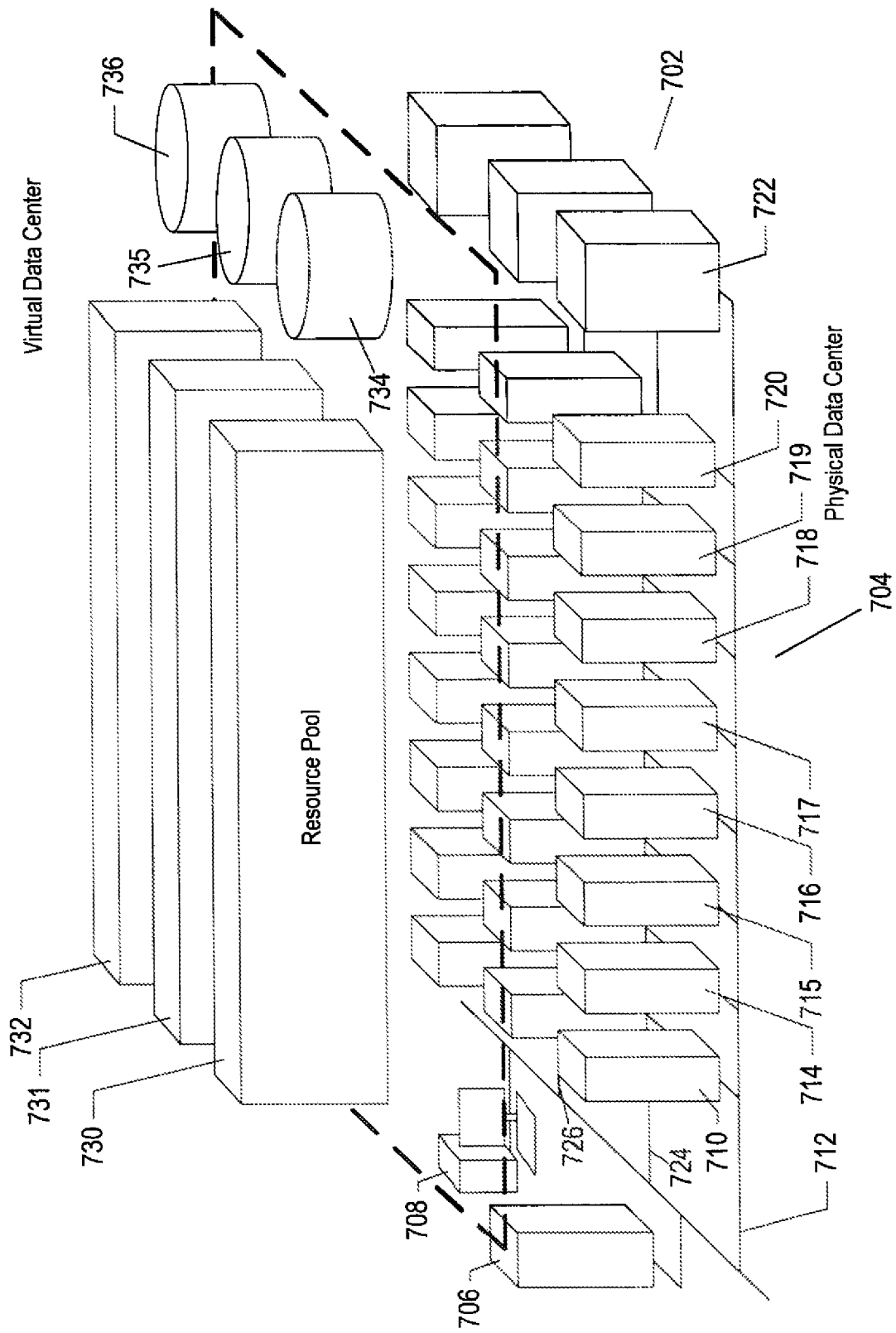
FIG. 7 shows examples of virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
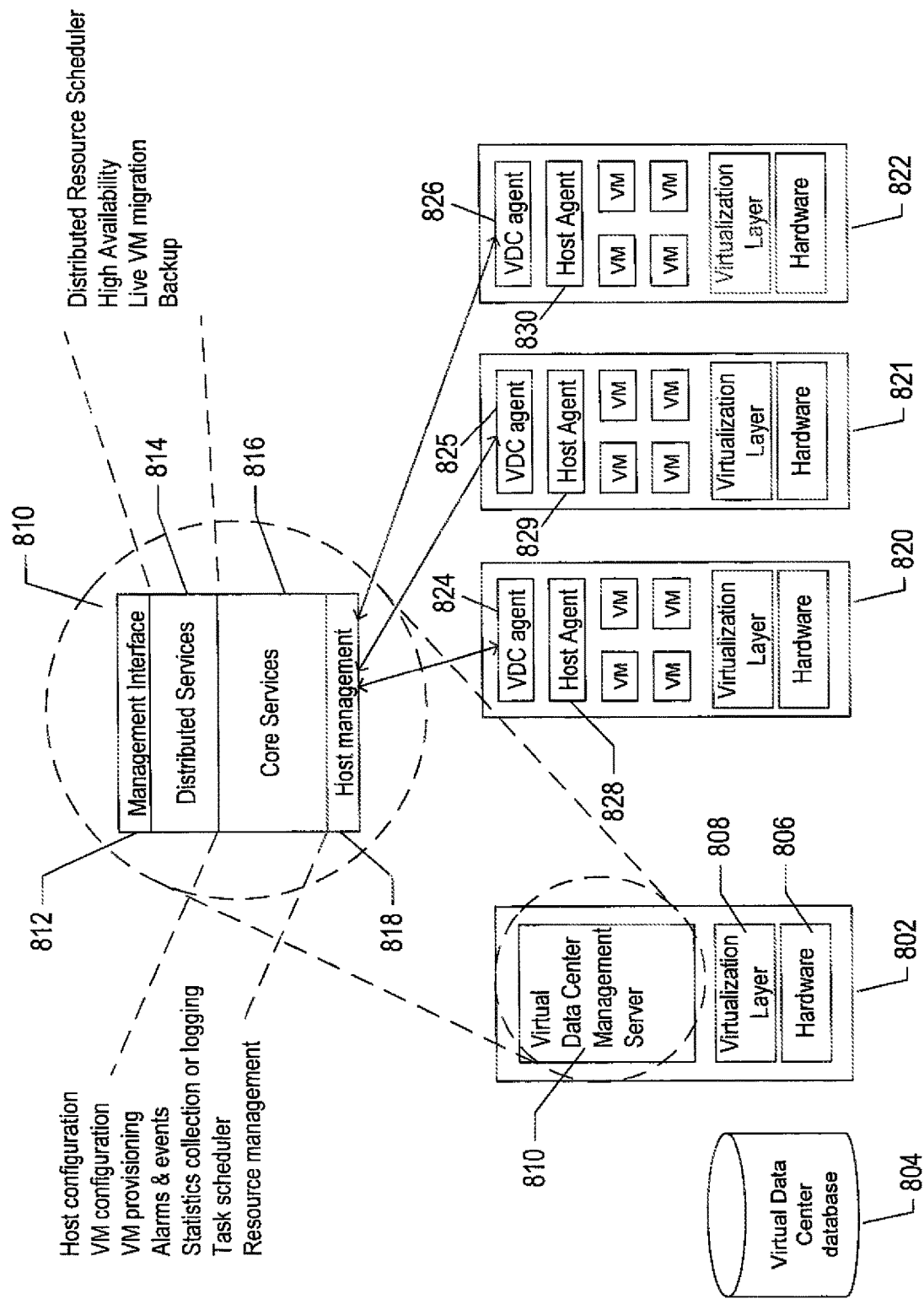
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant associated VDCs that can each be allocated to an individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
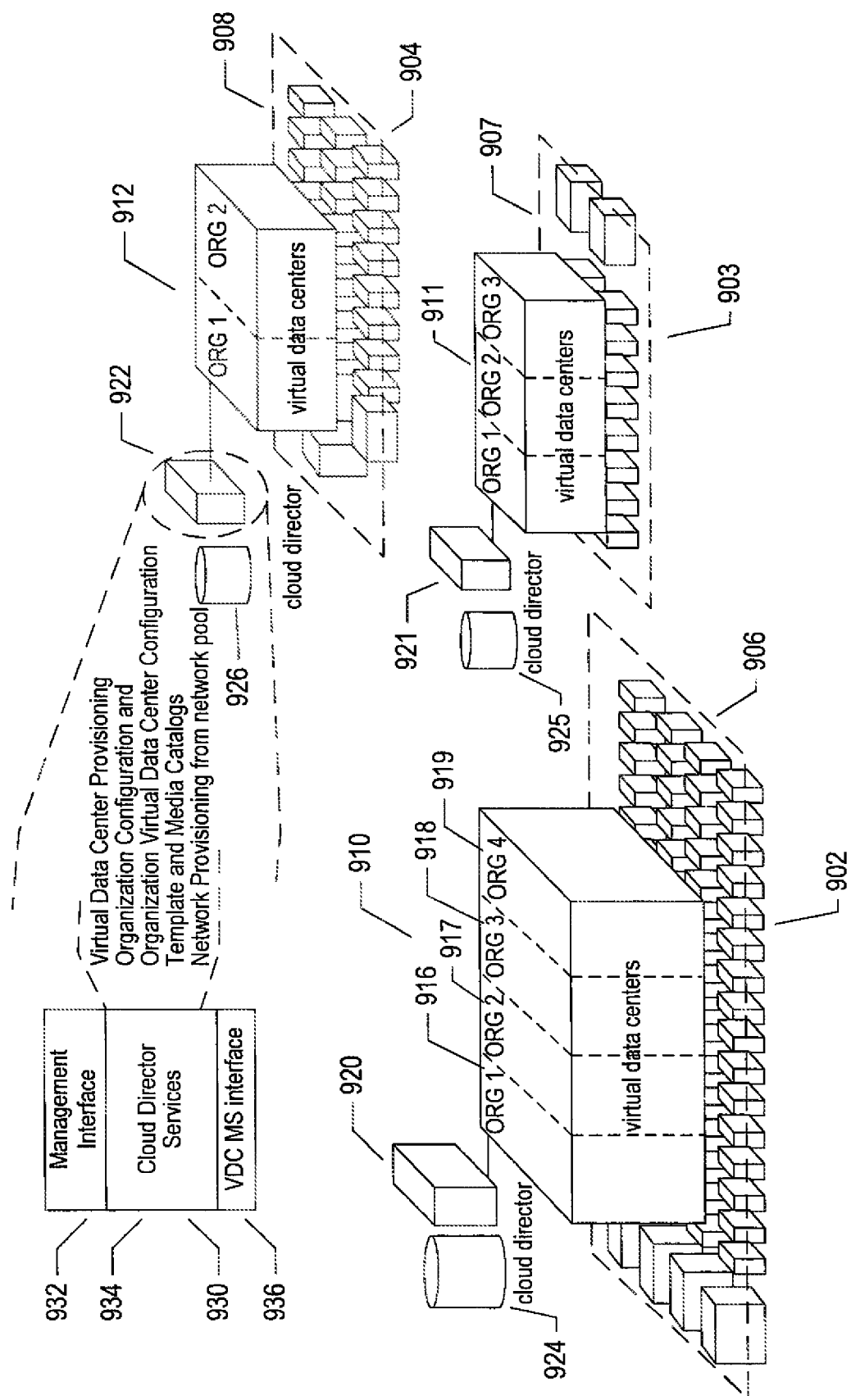
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
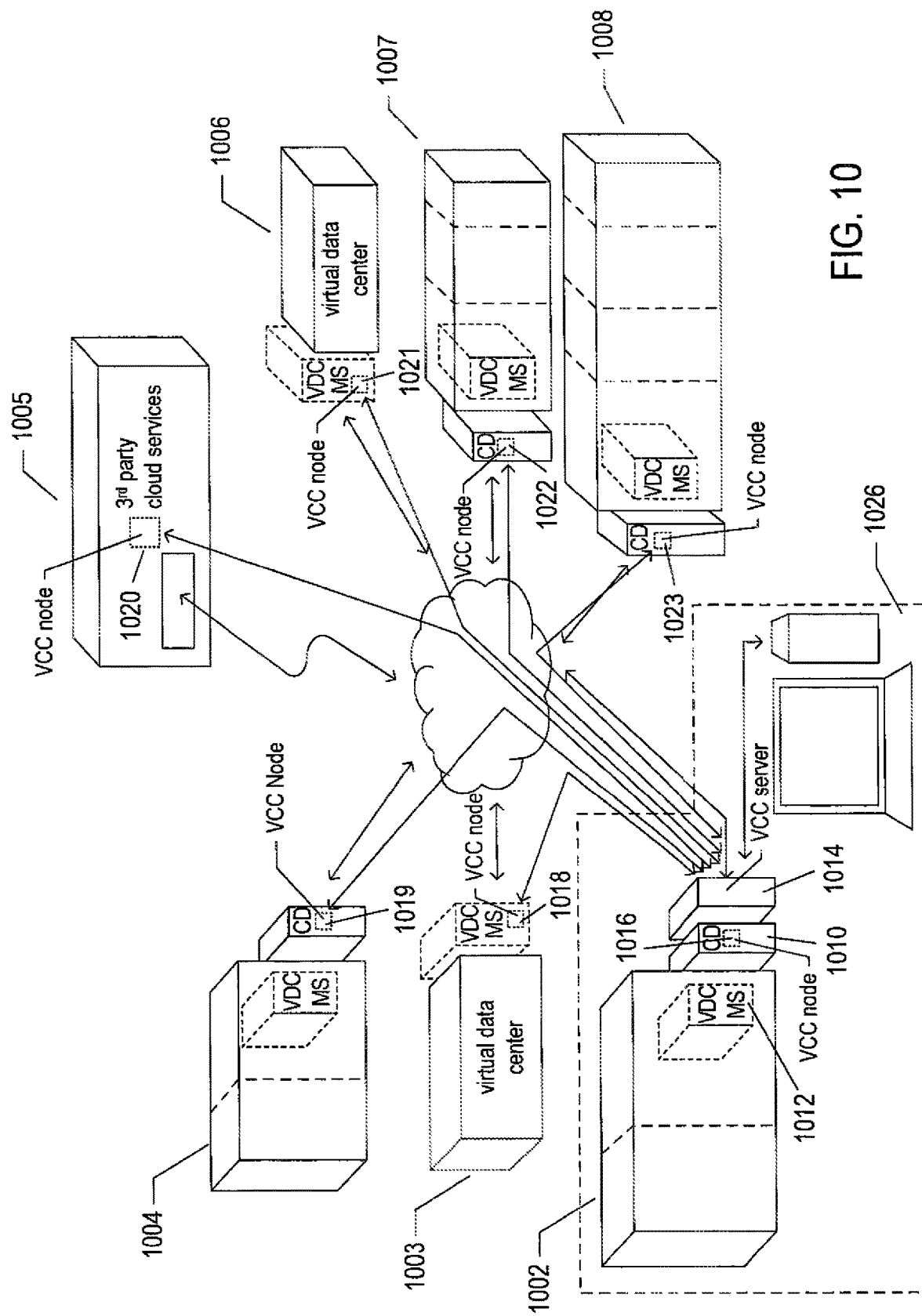
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous, distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. A container is an abstraction at the application layer that packages code and dependencies together. Multiple containers can run on the same computer system and share the operating system kernel, each container running as an isolated process in the user space. One or more containers are run in pods. For example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. The containers are isolated from one another and bundle their own software, libraries, and configuration files within in the pods. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
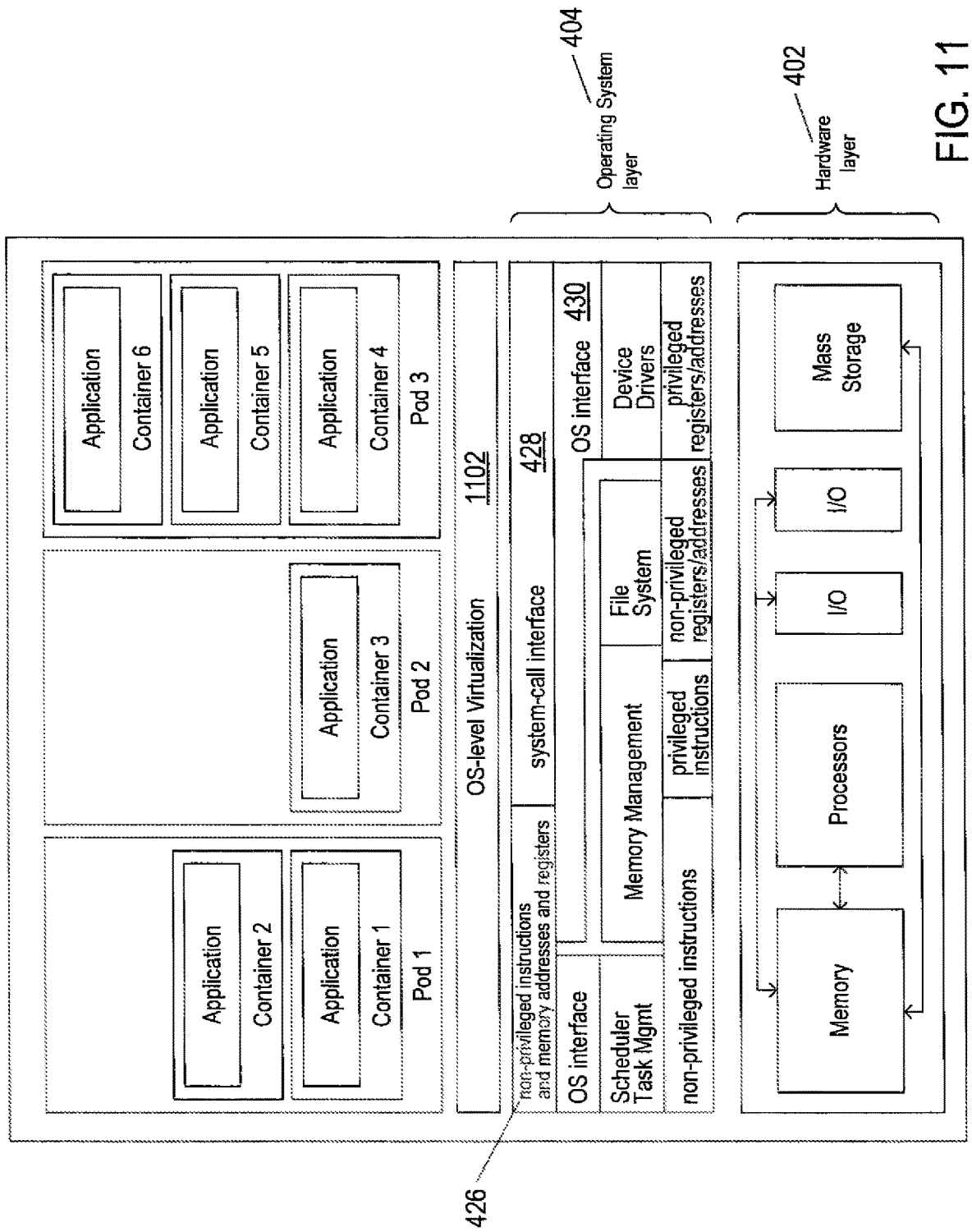
FIG. 11 shows an example server computer used to host three containers.

FIG. 11 shows an example server computer used to host three pods. As discussed above with reference to FIG. 4, an operating system layer 404 runs on the hardware layer 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly on the operating system layer 404, OSL virtualization involves an OSL virtualization layer 1102 that provides operating-system interfaces to each of the pods 1-3. In this example, applications are run separately in containers 1-6 that are in turn run in pods identified as Pod 1, Pod 2, and Pod 3. Each pod runs one or more containers with shared storage and network resources, according to a specification for how to run the containers. For example, Pod 1 runs an application 1104 in container 1 and another application 1106 in a container identified as container 2.

Figure 12:
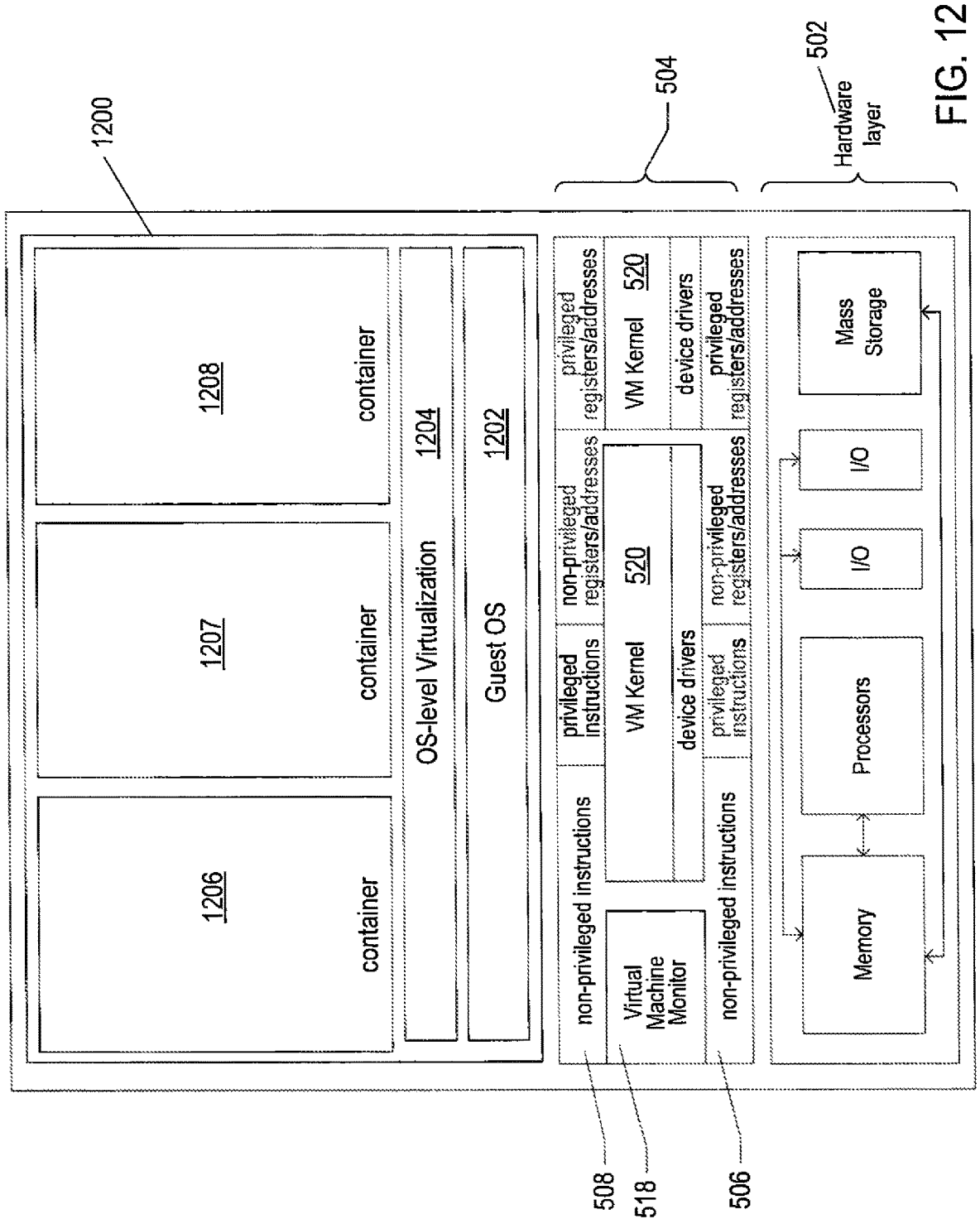
FIG. 12 shows an approach to implementing containers on a VM.

FIG. 12 shows an approach to implementing the containers in a VM. FIG. 12 shows a host computer similar to that shown in FIG. 5A, discussed above. The host computer includes a hardware layer 502 and a virtualization layer 504 that provides a virtual hardware interface 508 to a guest operating system 1202. Unlike in FIG. 5A, the guest operating system interfaces to an OSL-virtualization layer 1204 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large, distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
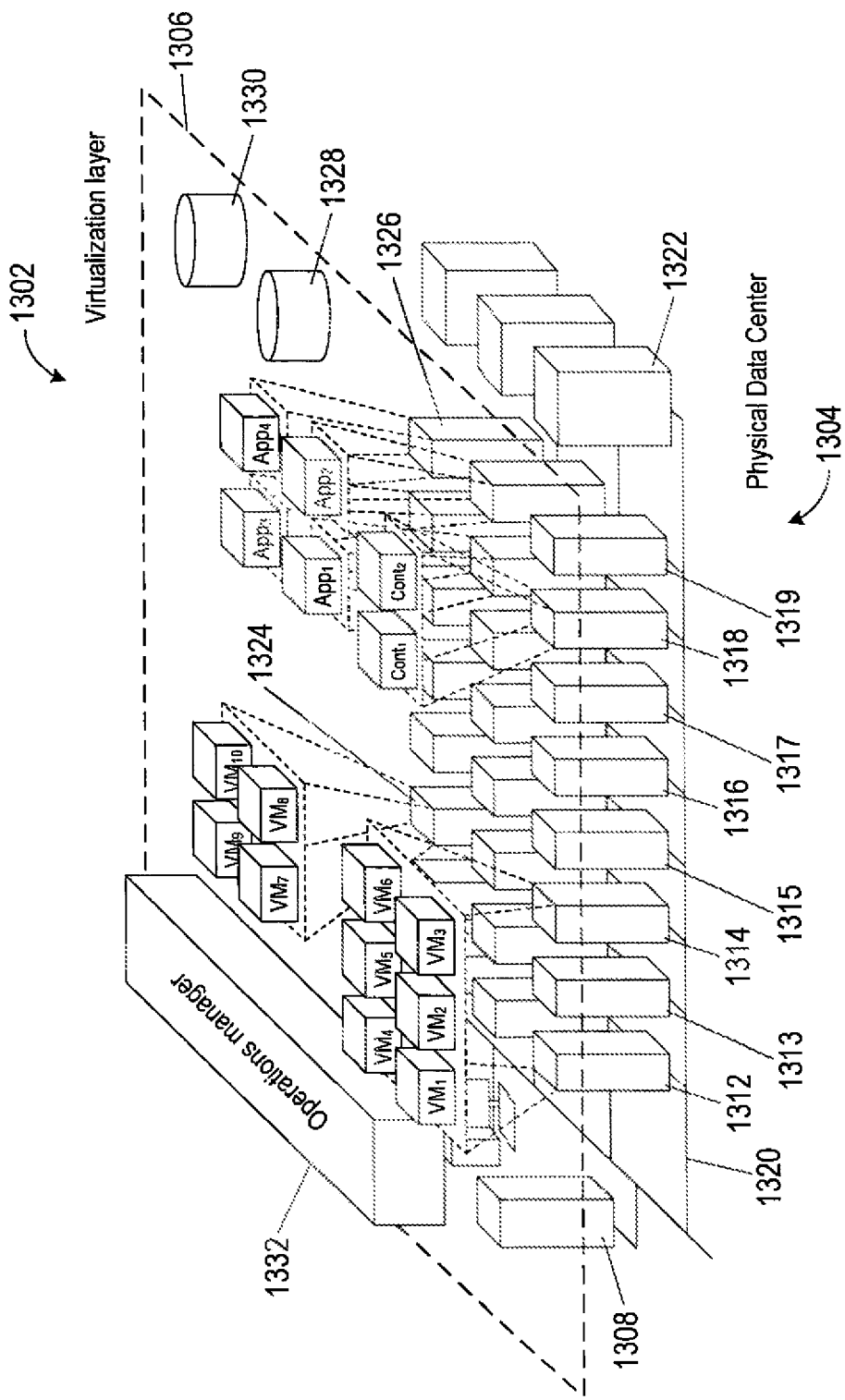
FIG. 13 shows an example of a virtualization layer located above a physical data center.

Computer-Implemented Methods and Systems for Discovering Incidents in a Data Center FIG. 13 shows an example of a virtualization layer 1302 located above a physical data center 1304. For the sake of illustration, the virtualization layer 1302 is separated from the data center 1304 by a virtual-interface plane 1306. The data center 1304 is an example of a distributed computing system. The data center 1304 comprises physical objects, including an administration computer system 1308, any of various computers, such as PC 1310, on which a virtual data center ("VDC") management interface may be displayed to system administrators and other users, server computers, such as server computers 1312-1319, data-storage devices, and network devices. Each server computer may have multiple network interface cards ("NICs") to provide high bandwidth and networking to other server computers and data storage devices. The server computers are networked together to form server-computer groups within the data center 1304. The example physical data center 1304 includes three server-computer groups each of which have eight server computers. For example, server-computer group 1320 comprises interconnected server computers 1312-1319 that are connected to a mass-storage array 1322. Within each server-computer group, certain server computers are grouped together to form a cluster that provides an aggregate set of resources (i.e., resource pool) to objects executing in the virtualization layer 1302.

The virtual-interface plane 1306 abstracts the resources of the physical data center 1304 to one or more VDCs comprising the virtual objects and one or more virtual data stores, such as virtual data store 1328. For example, one VDC may comprise the VMs running on server computer 1324 and virtual data store 1328. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and NICs formed from the physical switches, routers, and NICs of the physical data center 1304. Certain server computers host VMs and containers as described above. For example, server computer 1318 hosts two containers identified as $Cont_1$ and $Cont_2$; cluster of server computers 1312-1314 host six VMs identified as $VM_1$, $VM_2$, $VM_3$, $VM_4$, $VM_5$, and $VM_6$; server computer 1324 hosts four VMs identified as $VM_7$, $VM_8$, $VM_9$, $VM_{10}$. Other server computers may host applications as described above with reference to FIG. 4. For example, server computer 1326 hosts an application identified as $App_4$.

For the sake of illustration, the data center 1304 and virtualization layer 1302 are shown with a small number of objects. In practice, a typical data centers runs thousands of server computers that are used to run thousands of VMs and containers. Different data centers may include many different types of computers, networks, data-storage systems, and devices connected according to many different types of connection topologies described below.

Computer-implemented methods described herein are performed by an operations manager 1332 that is executed in one or more VMs on the administration computer system 1308. The operations manager 1332 provides several interfaces, such as graphical user interfaces ("GUIs"), for data center management to system administrators and application owners to change parameters and view results of the automated computer-implemented methods described herein. The operations manager 1332 receives numerous streams of time-dependent metric data about the performance or usage of different objects and resources in the data center.

Figure 14A:
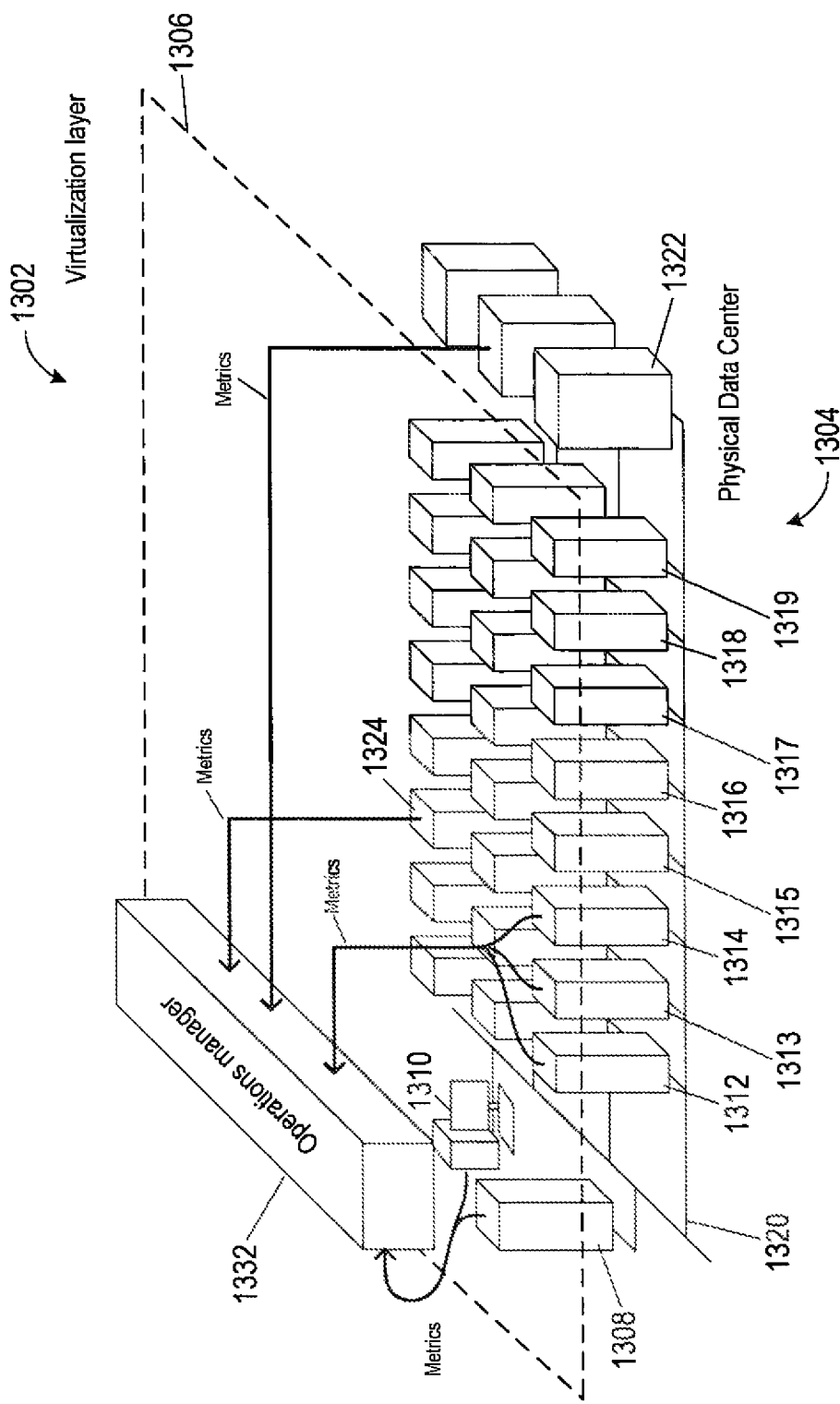
FIGS. 14A-14B show examples of operations manager receiving metrics from physical and virtual objects of the data center.
Figure 14B:
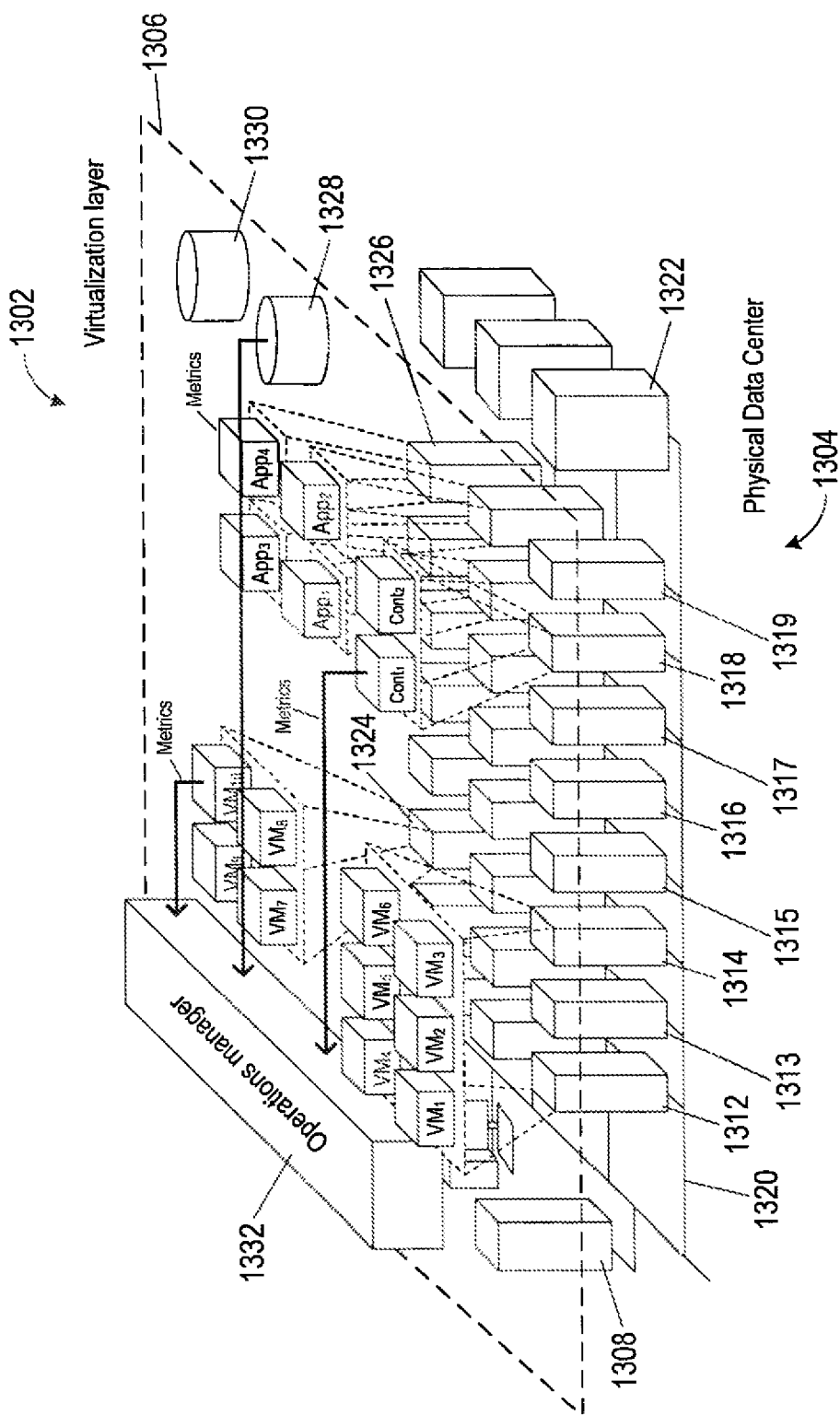

FIGS. 14A-14B show examples of the operations manager 1332 receiving attribute information from physical and virtual objects of the data center 1304. Directional arrows represent metrics sent from physical and virtual resources to the operations manager 1330. In FIG. 14A, the operating systems of PC 1310, server computers 1308 and 1324, and mass-storage array 1322 send metrics to the operations manager 1332. A cluster of server computers 1312-1314 send metrics to the operations manager 1332. In FIG. 14B, the VMs, containers, applications, and virtual storage may independently send metrics to the operations manager 1332. Certain objects may send metric values as the metric values are generated while other objects may only send metrics at certain times or when requested to send metrics by the operations manager 1332.

Figure 15:
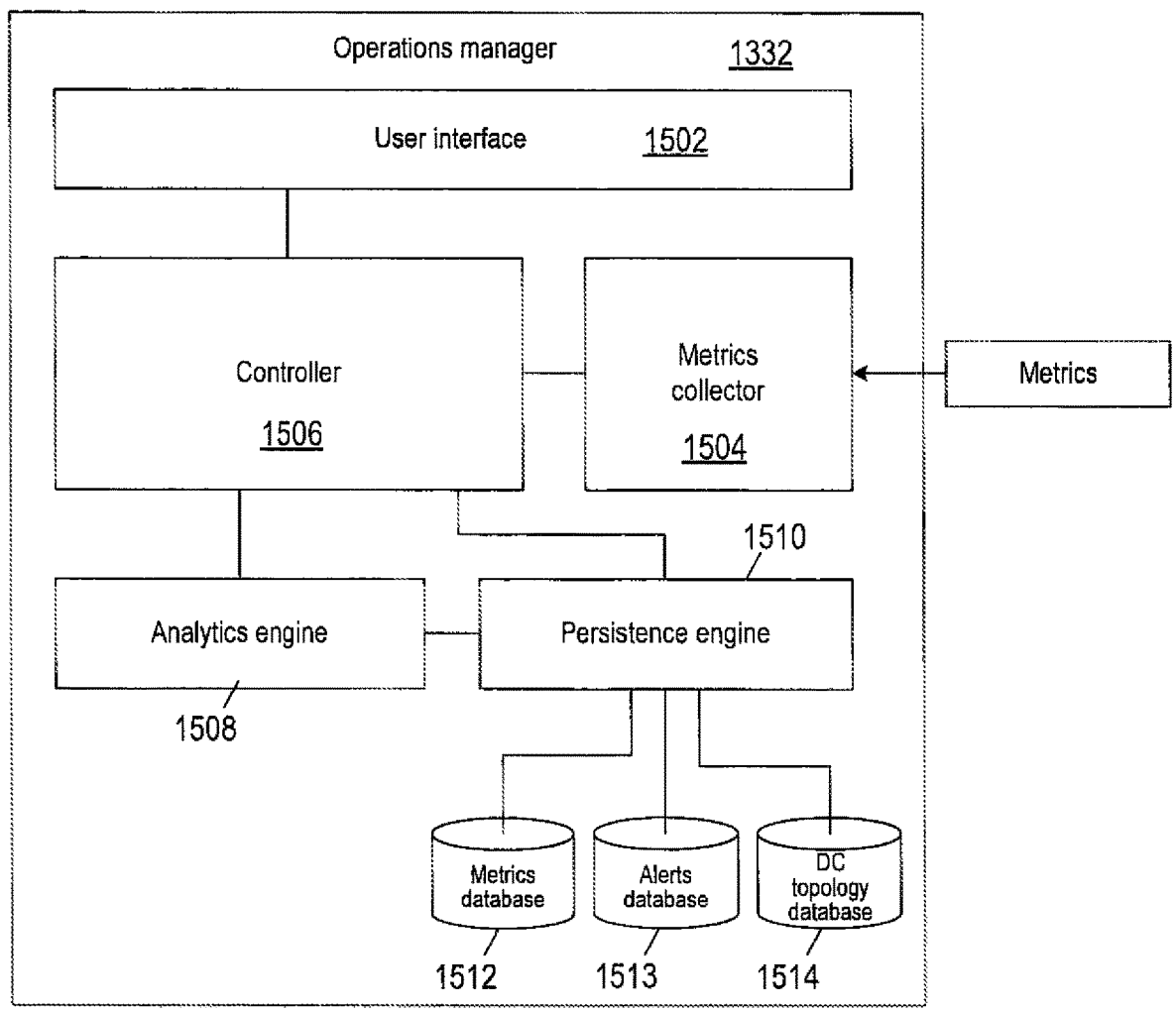
FIG. 15 shows an example architecture of an operations manager.

FIG. 15 shows an example architecture of the operations manager 1332. This example architecture of the operations management server 1332 includes a user interface 1502 that provides graphical user interfaces and user interface features for data center management, system administrators, and application owners to receive alerts, clusters of alerts, and execute recommended remedial measures. The operations manager 1332 includes a metrics collector 1504 that receives streams of metrics from agents deployed at sources of metric data. The operations manager 1332 includes a controller 1506 that manages and directs the flow of metrics received by the metrics collector 1504. The controller 1506 manages the user interface 1502, executes instructions received via the user interface 1502, and controls the flow of information displayed by the user interface 1502. The controller 1506 directs the flow of metrics to the analytics engine 1508 and manages the computational operations performed by the analytics engine 1508 as described below. The analytic engine 1508 detects metric-level abnormalities for use in alerts and systems health assessments. The analytics engine 1508 monitors key performance indicators ("KPIs") for problems with applications, maintains dynamic thresholds of metrics, generates alerts in real time when a metric or a KPI violates a corresponding threshold. The analytics engine 1508 performs the automated method of discovering incidents through clustering of alerts as described below. In other words, each cluster of alerts corresponds to an incident occurring with object executing in the data center. The controller 1506 manages the flow of output produced by the analytics engine 1508 to a persistence engine 1510, which stores information in, and retrieves information from, the data bases 1512-1514.

Each stream of metric data received by the operations manager 1332 is time-series data that may be generated by an event source, such as an operating system, a resource, or by an object itself. A stream of metric data associated with a resource comprises a sequence of time-ordered metric values that are recorded in spaced points in time called "time stamps." A stream of metric data is simply called a "metric" and is denoted by $$(x_i)_{i=1}^{N} = (x(t_i))_{i=1}^{N} \qquad (1)$$

where
- N is the number of metric values in a sequence of metric values;
- $x_i = x(t_i)$ is a metric value;
- $t_i$ is a time stamp indicating when the metric value was generated; and
- subscript i is a time stamp index, i=1, ..., N.

Figure 16:
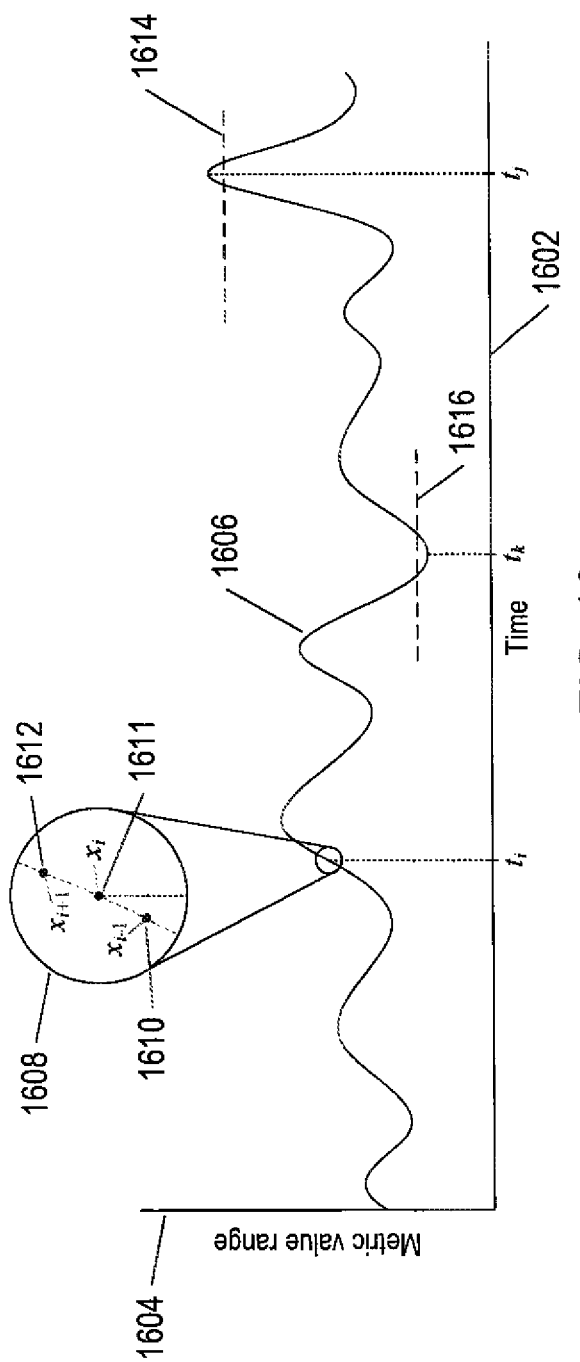
FIG. 16 shows a plot of an example metric.

FIG. 16 shows a plot of an example metric. Horizontal axis 1602 represents time. Vertical axis 1604 represents a range of metric values. Curve 1606 represents a metric as time-series data. In practice, a metric comprises a sequence of discrete metric values in which each metric value is recorded in a data-storage device. FIG. 16 includes a magnified view 1608 of three consecutive metric values represented by points. Each point represents an amplitude of the metric at a corresponding time stamp. For example, points 1610-1612 represent consecutive metric values (i.e., amplitudes) $x_{i-1}$, $x_i$, and $x_{i+1}$ recorded in a data-storage device at corresponding time stamps $t_{i-1}$, $t_i$, and $t_{i+1}$.

Metrics represent different types of measurable quantities of physical and virtual objects of a data center and are stored in a metric database 1512 of a data storage appliance. A metric can represent CPU usage of a core in a multicore processor of a server computer over time. A metric can represent the amount of virtual memory a VM uses over time. A metric can represent network throughput for a server computer. Network throughput is the number of bits of data transmitted to and from a physical or virtual object and is recorded in megabits, kilobits, or bits per second. A metric can represent network traffic for a server computer or a VM. Network traffic at a physical or virtual object is a count of the number of data packets received and sent per unit of time. A metric may can represent object performance, such as CPU contention, response time to requests, and wait time for access to a resource of an object. Network flows are metrics that indicate a level of network traffic. Network flows include, but are not limited to, percentage of packets dropped, data transmission rate, data receiver rate, and total throughput.

The analytics engine 1508 constructs key performance indicators ("KPIs") of application performance based on the metrics and stores the KPIs in the metrics database 1512. An application, for example, can have numerous associated KPIs. Each KPI is metric that represents the size, amount, or degree of object performance and is used by the analytics engine 1508 to detect performance problems. A KPI is a metric constructed from other metrics and is used as a run time indicator of the health of an application executing in the data center. A distributed resource scheduling ("DRS") score is an example of a KPI that is constructed from other metrics and is used to measure the performance level of a VM, container, or components of a distributed application. The DRS score is a measure of efficient use of resources (e.g., CPU, memory, and network) by an object and is computed as a product of efficiencies as follows:

$$x(t_i) = EFFCY_{CPU}(t_i) \times EFFCY_{Mem}(t_i) \times EFFCY_{Net}(t_i) \qquad (2)$$

where $$EFFCY_{CPU}(t_i) = \frac{CPU\ \text{usage}(t_i)}{\text{Ideal}\ CPU\ \text{usage}};$$

$$EFFCY_{Mem}(t_i) = \frac{\text{Memory usage}(t_i)}{\text{Ideal Memory usage}}; \text{ and}$$

$$EFFCY_{Net}(t_i) = \frac{\text{Network throughpu}(t_i)}{\text{Ideal Network throughpu}}$$

The metrics CPU usage($t_i$), Memory usage($t_i$), and Network throughput($t_i$) of an object are measured at points in time as described above with reference to Equation (2). Ideal CPU usage. Ideal Memory usage, and Ideal Network throughput are preset. For example. Ideal CPU usage may be preset to 30% of the CPU and Ideal Memory usage mu be preset to 40% of the memory. DRS scores can be used for, example, as a KPI that measures the overall health of a distributed application by aggregating, or averaging, the DRS scores of each VM that executes a component of the distributed application. Other examples of KPIs include average response times to client request, error rates, contention time for resources, or a peak response time. Other types of KPIs can be used to measure the performance level of a cloud application. A cloud application is a distributed application with data storage and logical components of the application executed in a data center and local components provide access to the application over the internet via a web browser or a mobile application on a mobile device. For example, a KPI for an online shopping application could be the number of shopping carts successfully closed per unit time. A KPI for a website may be response times to customer requests. KPIs may also include latency in data transfer, throughput, number of packets dropped per unit time, or number of packets transmitted per unit time.

Thresholds may be used to monitor metrics for events. An event is detected when one or more metric values violate an upper threshold 1614 denoted by:

$$x_j \geq Th_{upper} \qquad (3a)$$

where $Th_{upper}$ is an upper threshold; and
An event is detected when one or more metric values violates a lower threshold 1616 denoted by:

$$x_k \leq Th_{lower} \qquad (3b)$$

where $Th_{lower}$ is a lower threshold.

In one implementation, the thresholds in Equations (3a) and (3b) are time-independent thresholds. Time-independent thresholds can be determined for trendy and non-trendy randomly distributed metrics. In another implementation, the thresholds may be time-dependent, or dynamic, thresholds. Dynamic thresholds can also be determined for trendy and non-trendy periodic metric data. Time-independent thresholds may be determined as described in US Publication No. 2015/0379110A1, filed Jun. 25, 2014, which is owned by VMware Inc. and is herein incorporated by reference. Dynamic thresholds may be determined as described in U.S. Pat. No. 10,241,887, which is owned by VMware Inc. and is herein incorporated by reference.

The analytics engine 1508 detects threshold violations by comparing the run-time metric values to corresponding thresholds, as described above with reference to Equations (3a) and (3b). In response to detection of a threshold violation, the analytics engine 1508 generates an alert, indicating that an object or resource represented by the metric has entered an abnormal state. The controller 1506 displays the alerts in the user interface 1502 and stores the alerts in the alerts database 1513.

The relationships and proximity between objects of a data center are represented by a data center topology hierarchy. A data center topology is a graph-based structure with data center objects represented by nodes that are in parent and child relationships, or ascendant/descendants in graph terminology. Parent child relationships between objects are represented by edges that connect nodes.

Figure 17:
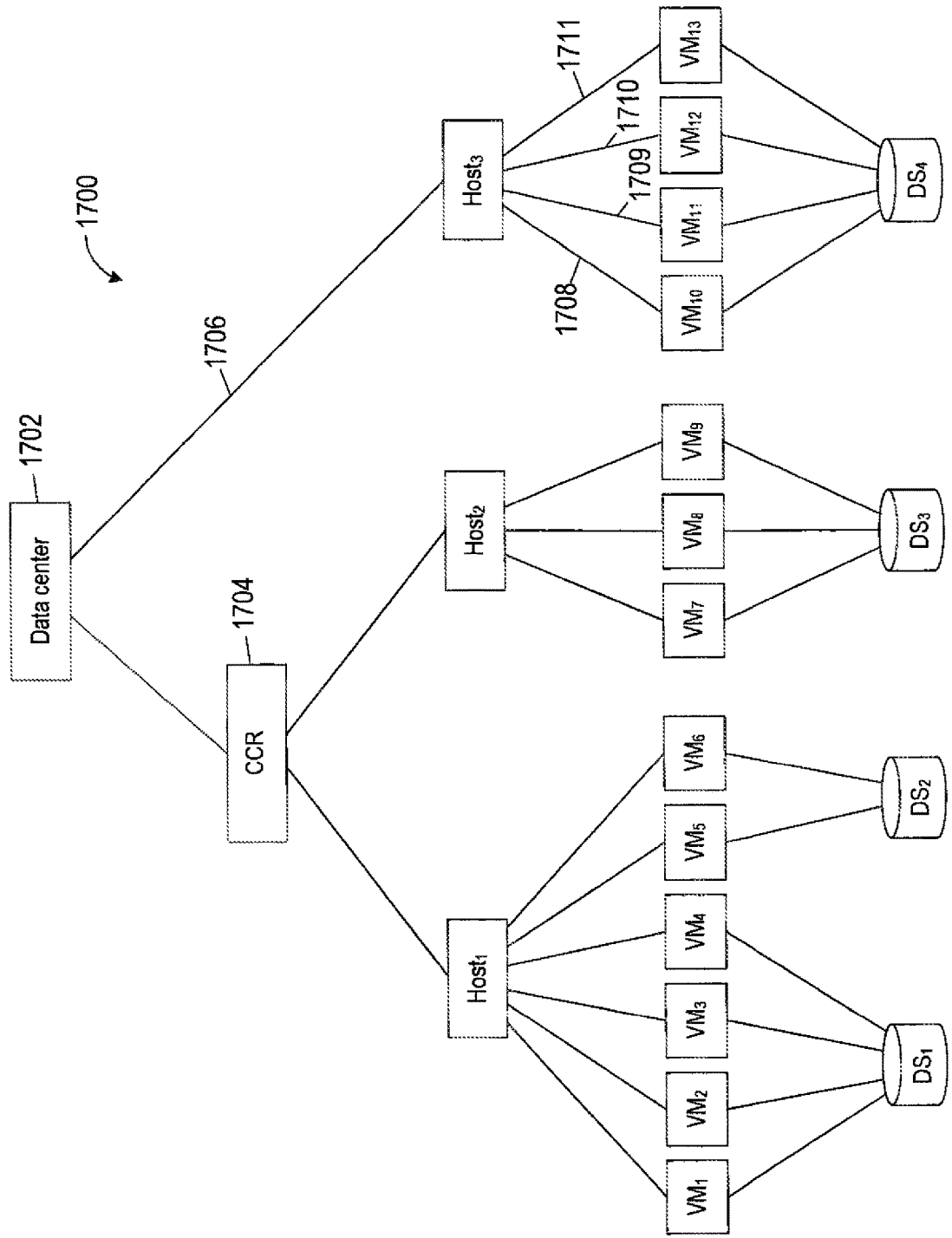
FIG. 17 shows an example data center graph that represents a topology objects in a data center.

FIG. 17 shows an example data center graph 1700 that represents the topology hierarchy of data center objects. Each object of the data center is represented by a node. The example graph has a root node 1702 that represents the data center itself. The nodes include a cluster compute resource ("CCR") 1704 that collects configuration and summary properties for cluster compute resource objects. Three nodes represent hosts denoted by $Host_1$, $Host_2$, and $Host_3$. Thirteen nodes represent thirteen VMs denoted by $VM_i$, where i=1, . . . , 13. Four nodes represent datastores denoted by $DS_1$, $DS_2$, $DS_3$, and $DS_4$. Nodes connected by edges represent relationships between objects. For example, edge 1706 indicates that $Host_3$ runs in the data center. Edges 1708-1711 indicate that $VM_{10}$, $VM_{11}$, $VM_{12}$, and $VM_{13}$ are hosted by $Host_3$. Edges 1712-1714 indicate that $VM_7$, $VM_8$, and $VM_9$, utilize datastore $DS_3$ for data storage.

The data center graph reveals the topological hierarchy of data center objects associated with different layers of the data center graph. Objects of a layer of objects located farther away from the root node than another layer objects have a lower rank than objects in the layer located closer to the root node. For example, in FIG. 17, the data center node 1702 is the root node and has the highest rank of the data center objects. The CCR 1704 is a lone object in the second layer and has the second highest rank. The hosts are in a third layer and have the third highest rank. The VMs are in the same layer and have the fourth highest rank. The datastores are in the fifth layer and have the fifth highest rank.

A typical adverse incident in a data center starts alerts that have a strong time-dependent component and physical proximity component. For example, alerts that occur close in time are more likely to be related than alerts that occur with greater time separation. In addition, alerts associated with objects and resources that are located in close topological proximity to one another in a data center graph are more likely to be related than are alerts associated with objects located farther away from each other in the data center graph. For example, in FIG. 17A, $VM_{10}$ is in closer topological proximity to the $Host_3$ than to $Host_1$. Topological proximity of two objects in the data center graph is measured by number of edges separating the objects and is called "hops." For example, in FIG. 17, $VM_1$ is one hop away from $Host_1$ and is three hops away from the data center node 1702. VMs $VM_{10}$ and $VM_{11}$ are separated by two hops (i.e., edges 1708 and 1709).

Because many objects running in a typical data center share multiple resources, exchange data, rely on many of the same networks, and depend on the performance of other objects also running in the data center, problems with a few objects or resources can quickly increase into multiple problems that adversely affect the performance of numerous objects running in the data center. As a result, the number of alerts generated in a short period of time, such as minutes to just a few hours, can reach into the thousands, making it impossible for system administrators to track events, identify related events, and apply appropriate remedial measures. A large number of events occurring in a short period of time is called an event storm. A system administrator or application owner presented with alerts on a system console or monitor has no way of knowing which events behind the alerts are related and which are isolated incidents.

Figure 18:
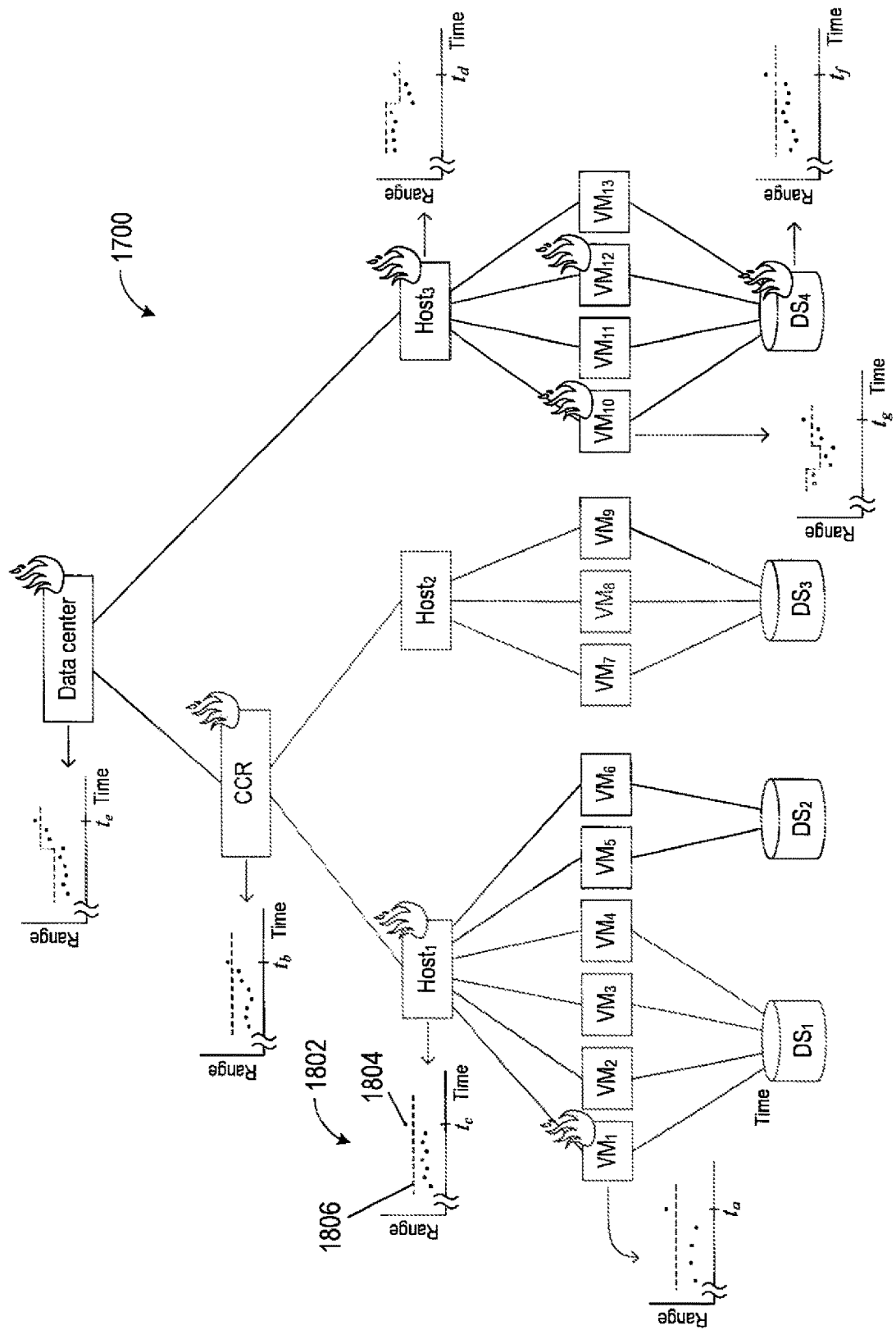
FIG. 18 shows an example of objects of a data center graph with events that start alerts.

FIG. 18 shows an example of objects of the data center graph 1700 in which object experience events that start alerts. Flames mark objects that are experiencing abnormal behavior. Plots of metrics located adjacent to objects include threshold violations that start corresponding alerts. For example, plot 1802 represents a metric of a resource of the $Host_1$. In this example, metric value 1804 violates corresponding threshold 1806 at time $t_c$ which starts an alert. Each of the alerts is recorded in the alerts database 1513 by the analytics engine 1508.

Figure 19:
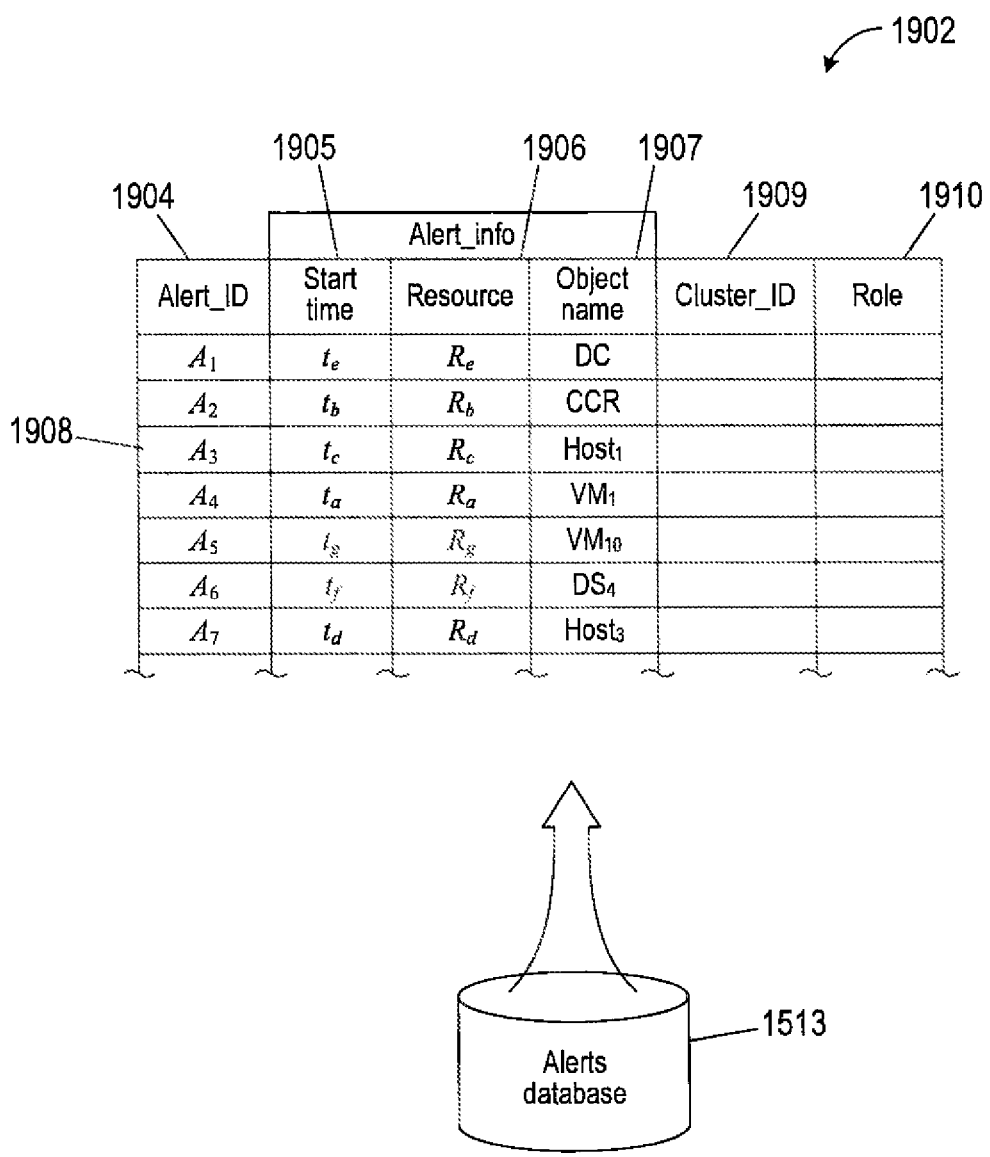
FIG. 19 shows an example of the type of alert information recorded in a data table of an alerts database.

FIG. 19 shows an example of the type of alert information recorded in the alerts database 1513. Table 1902 includes a column 1904 that identifies the alert, column 1905 identifies the start time of the event, column 1906 identifies the resource of the object experiencing the event that started the alert, column 1907 identifies the object itself. The alerts correspond to the alerts and start times in FIG. 18. For example, row 1908 identifies the name of the alert denoted by $A_3$, time of the alert $t_c$, resource $R_c$ that experienced the event, and object name, which is $Host_1$ in FIG. 18. The resource represented by $R_c$ could be the CPU or memory of $Host_1$. Entries in columns 1905-1907 comprise the alert information. Entries in columns 1909 and 1910 are determined by the clustering methods described below.

A single alert reveals an event. Numerous alerts reveal numerous corresponding events. However, examination of alerts alone does not reveal if the events are part of a single incident in the data center. The analytics engine 1508 performs automated methods of discovering incidents through clustering of alerts in streaming events. A data center incident is associated with a cluster of alerts that are related in time and by topological proximity. Topological proximity refers to the number of hops between objects in a data center topological hierarchy. The methods employ a two-part distance measure of how far alerts are in terms of time and topological proximity. Consider two alerts $A(t_i, R_i)$ and $A(t_j, R_j)$, where $t_i$ and $t_j$ are start times, and $R_i$ and $R_j$ are resources of two data center objects. The time difference between the alerts is $dist_t(t_i, t_j)=|t_j-t_i|$. The number of hops between resources $R_i$ and $R_j$ is $dist_K(R_i, R_j)$=No. of hops. The methods perform clustering based on neighborhoods of the alerts. The neighborhood of an alert $A(t_i, R_i)$, denoted by $N_\in(A(t_i, R_i))$, is defined by $$N_\in(A(t_i,R_i))=\{A(t_j,R_j)\in D | dist_t(t_i,t_j)\le T_\in \text{ and } dist_K(R_i,R_j)\le K_\in\} \quad (4)$$

where $T_\in$ is a fixed time limit: and $K_\in$ is a limit on the number of hops separating the two alerts A neighborhood of an alert contains alerts that are started with start time differences that are less than a time, $T_\in$, and refer to objects that are located on the data center graph topology in less than or equal to, $K_\in$, hops. The number of alerts in a neighborhood of an alert is given by $\|N_\in(A(t_i, R_i))\|$, $\|\cdot\|$ denotes cardinality of a set.

An alert is identified as a core alert of a cluster of alerts, an edge alert of a cluster of alerts, or a noise alert based on the number of alerts that lie within the neighborhood of the alert. Let MinPts represent a user selected minimum number of alerts for a core alert. An alert $A(t_i, R_i)$ is core alert of a cluster of alerts when $\|N_\in(A(t_i, R_i))\| \geq$ MinPts. An alert $A(t_i, R_i)$ is a border alert of a cluster of alerts when MinPts $> \|N_\in(A(t_i, R_i))\| > 1$ and contain at least one core alert in addition to the alert $A(t_i, R_i)$. An alert $A(t_i, R_i)$ is noise when $\|N_\in(A(t_i, R_i))\| = 1$ (i.e., when the neighborhood contains only the alert $A(t_i, R_i)$).

Figure 20:
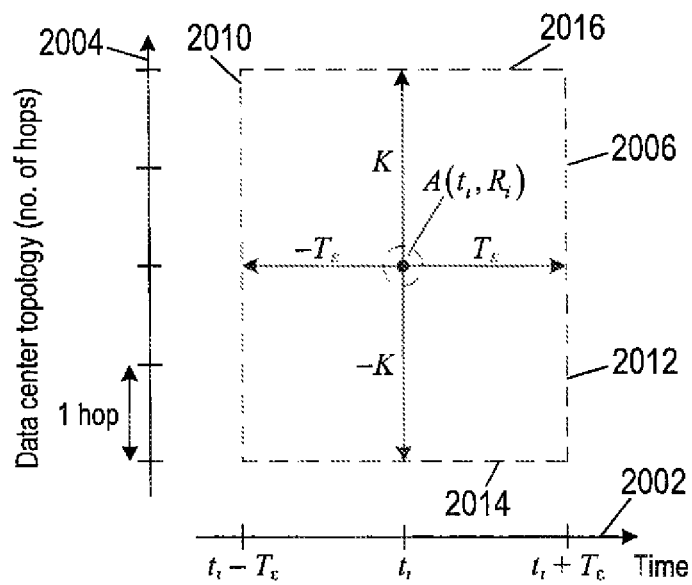
FIG. 20 shows an example a neighborhood of an alert.

FIG. 20 shows an example of a neighborhood of an alert $A(t_i, R_i)$. Horizontal line 2002 represents a time axis. Vertical line 2004 represents a range of hops between objects in a data center graph. Solid dot 2006 represents the alert $A(t_i, R_i)$ with start time $t_i$ located along the time axis 2002. Dashed rectangle 2008 represents boundaries of a neighborhood $N_\in(A(t_i, R_i))$ centered at the location of the alert $A(t_i, R_i)$. In this example illustration, the fixed time limit T, corresponds to vertical sides 2010 and 2012. The limit on the number of hops is set to 2 (i.e., $K_\in = 2$) as represented by horizontal sides 2014 and 2016.

An alert $A(t_j, R_j)$ is an element of the neighborhood $N_\in(A(t_i, R_i))$ if $t_i - T_\in \leq t_j \leq t_i + T_\in$ and the alert is within two hops of the alert $A(t_i, R_i)$.

Figure 21A:
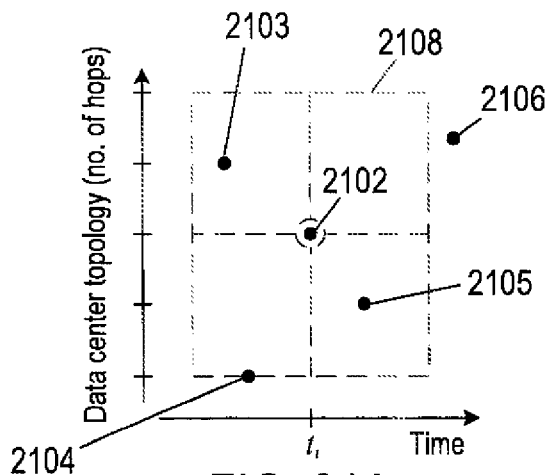
FIGS. 21A-21C show examples of a core alert, a border alert, and noise, respectively.
Figure 21B:
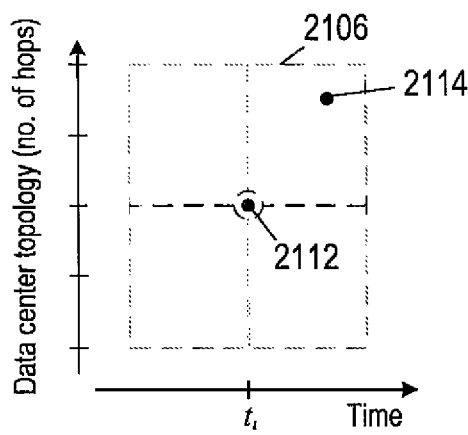
Figure 21C:
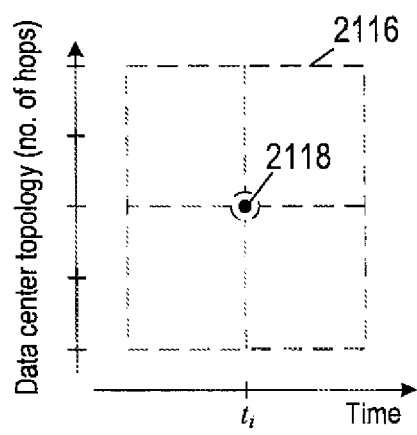

FIGS. 21A-21C show examples of a core alert, a border alert, and noise, respectively. In this example, the minimum number of alerts for a core alert is set to 3 (i.e., MinPts=3). In FIG. 21A, five alerts 2102-2106 are represented by solid points. Boundaries of the neighborhood of the alert 2102 are represented by rectangle 2108. The alert 2102 is a core alert because the alerts 2103-2105 lie within the neighborhood 2108. As a result, the neighborhood 2108 contains 4 alerts, which is greater than MinPts. In FIG. 21B, rectangle 2110 represents the boundaries of a neighborhood of the alert 2112. The alert 2112 is a border alert because the neighborhood 2110 contains the two alerts 2112 and 2114, where the alert 2114 is a core point, and the number of points in the neighborhood is less than MinPts and is greater than 1. In FIG. 21C, rectangle 2116 represents the boundaries of a neighborhood of the alert 2118. The alert 2118 is noise because the neighborhood 2116 contains the single alert 2118.

An alert $A(t_i, R_i)$ is directly density-reachable from an alert $A(t_j, R_j)$ if 1) $A(t_i, R_i) \in N_\in(A(t_j, R_j))$ and $A(t_j, R_j)$ is a core alert (i.e., $\|N_\in(A(t_j, R_j))\| \geq$ MinPts. In FIG. 21A, the alert 2103 is directly density-reachable from the alert 2102 because the alert 2103 lies within the neighborhood 2108 and the neighborhood contains more alerts than MinPts=3.

Figure 21D:
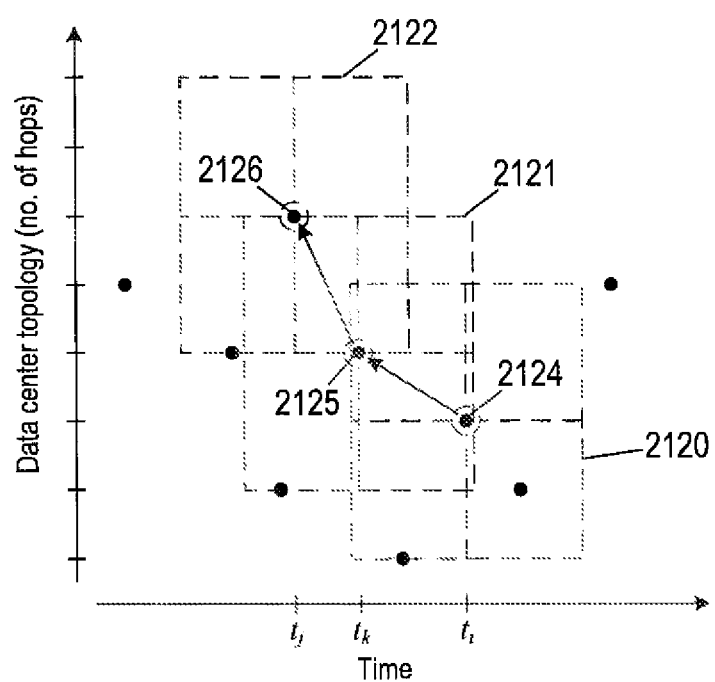
FIG. 21D shows an example of a density reachable alert.

An alert $A(t_i, R_i)$ is density reachable from an alert $A(t_j, R_j)$ if there is a chain of alerts $A(t_1, R_1), \ldots, A(t_n, R_n), A(t_i, R_i) = A(t_1, R_1), A(t_j, R_j) = A(t_n, R_n)$ such that $A(t_{k+1}, R_{k+1})$ is directly density-reachable from $A(t_k, R_k)$ for $k=1, \ldots, n$. FIG. 21D shows an example of a density reachable alert. Neighborhoods 2120-2122 are centered at alerts 2124-2126, respectively. Alert 2126 is density reachable from the alert 2124 because there is an intermediate alert 2125 that is directly density-reachable from the alert 2124 and the alert 2126 is directly density-reachable from the alert 2125.

Given MinPts, $T_\in$, and $K_\in$, a cluster of alerts can be discovered by first arbitrarily selecting a core alert as a seed and retrieving all alerts that are density reachable from the seed obtaining the cluster containing the seed. In other words, consider an arbitrarily selected core alert. Then the set of alerts that are density reachable from the core alert is a cluster of alerts. The cluster of alerts corresponds to an incident occurring with objects executing in the data center.

The analytics engine 1508 identifies clusters of alerts in a stream of run-time alerts based on the minimum number of points MinPts and the time and proximate topology parameters ($T_\in$, $K_\in$). Let $t_{cur}$ denote the current time. Clusters of run-time alerts are identified in a sliding run-time window that ends at the current time $t_{cur}$ and begins at a time $t_{cur} - \Gamma$, where $\Gamma$ is the duration of the run-time window. For example, the duration $\Gamma$ can be set to any suitable time length, such as 5 minutes. 15 minutes, 30 minutes, one hour, two hours, or six hours. The analytics engine 1508 partitions the duration of the time window into N equal duration time intervals, where N is greater than three, and the duration of the intervals $\Delta = \Gamma/N$. For example, if the duration of the run-time window is set to 60 minutes and N is set to 4, the time intervals are each 15 minutes. In the following examples, the run-time window 2208 is partitioned into four equal length intervals identified as Interval_1, Interval_2, Interval_3, and Interval_4, where Interval_1 is the earliest interval, Interval_2 is the second earliest interval, Interval_3 is the third earliest interval, and Interval_4 is the latest interval.

Figure 22:
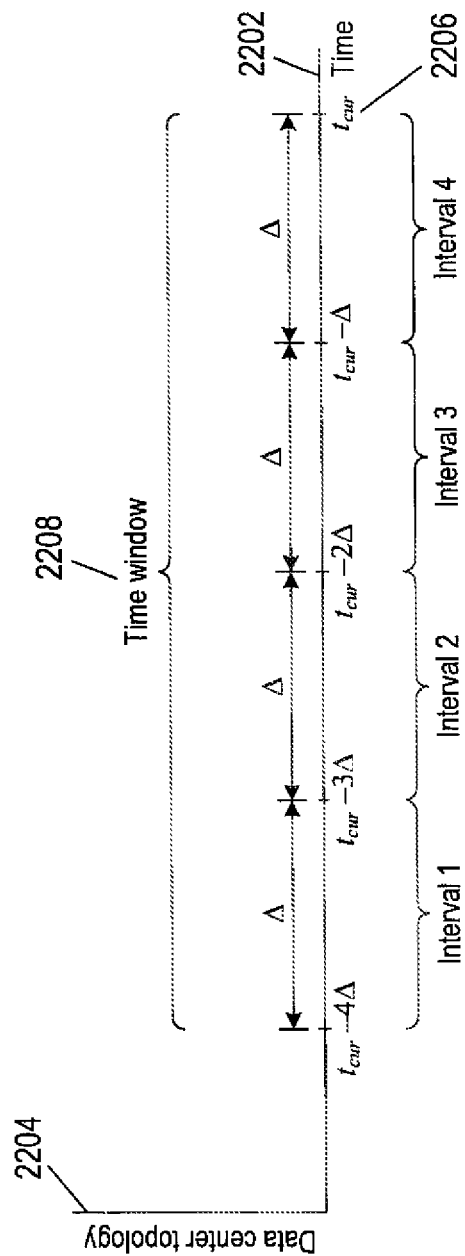
FIG. 22 shows an example of a run-time window partitioned into four equal duration time intervals.

FIG. 22 shows an example of a run-time window partitioned into four equal duration time intervals. Horizontal line 2202 represents a time axis. Vertical axis 2204 represents the distance between objects in the data center topology in terms of number of hops. The current time $t_{cur}$ 2206 is marked along the time axis. The run-time window 2208 is partitioned into four equal duration time intervals, each with a duration denoted $\Delta$.

Figure 23:
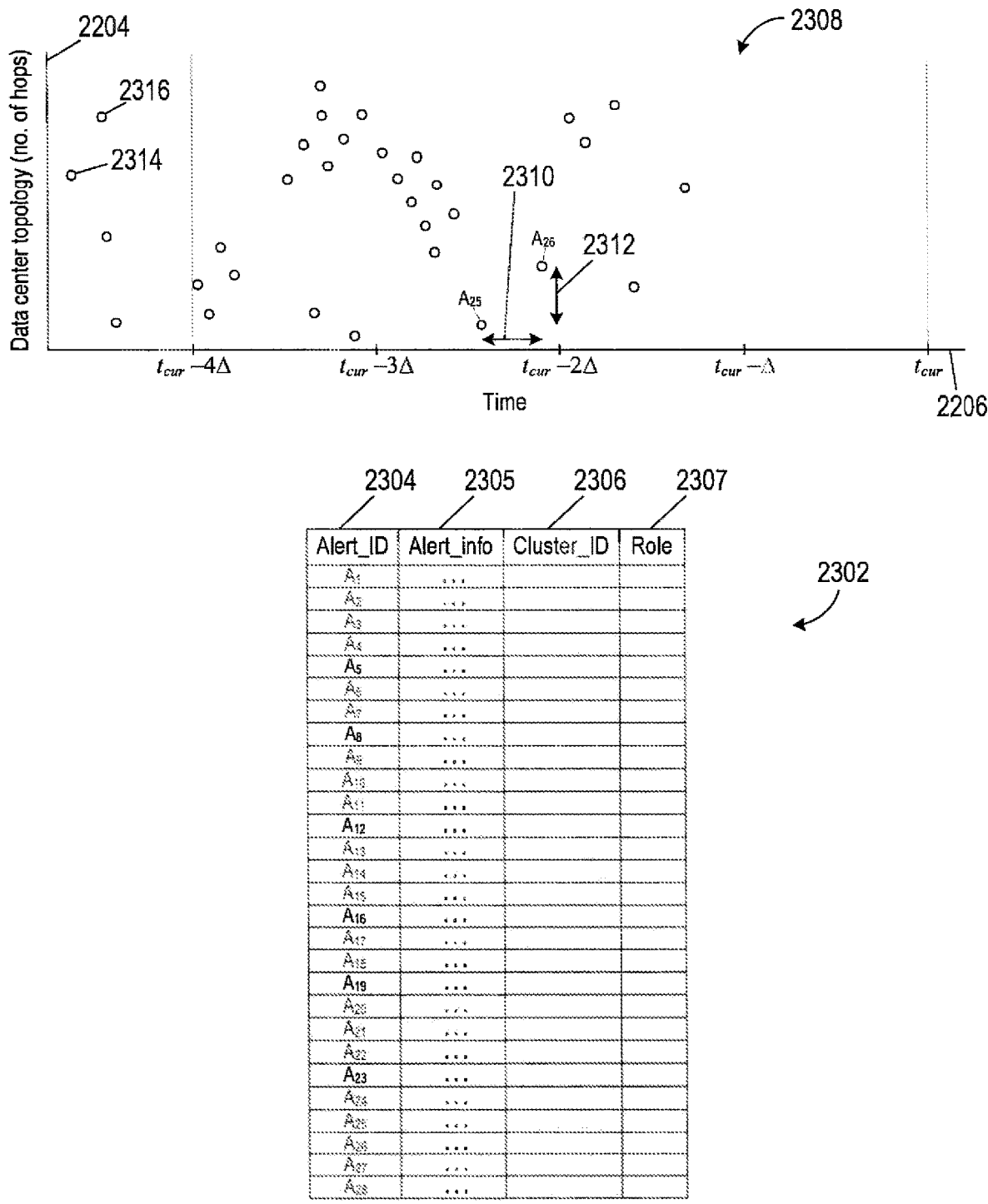
FIG. 23 shows an example data table that represents alerts with start times in a run-time window retrieved from an alerts database.

The analytics engine 1508 gets alerts with start times from the alerts database 1513 in the run-time window 2208. FIG. 23 shows a data table 2302 that represents 28 alerts with start times in the run-time window retrieved from the alerts database 1513. Column 2304 list the alert IDs of the 28 alerts. Column 2305 list the alert information of each alert as described above with reference to FIG. 19. Ellipses are used to represent the alert information. Columns 2306 and 2307 list blank entries for cluster identification ("ID") and role each alert has in the clusters, respectively. The ID can be a name or an alphanumeric term or word. The automated method described below determines the cluster each alert belongs to and the role each alert has in the cluster. For the sake of illustration, FIG. 23 also shows an example plot 2308 of the alerts shown in the table 2302. Open dots represent the alerts and enable a visual representation of relative time difference and distance in terms of hops between alerts. For example, directional arrow 2310 represents the time difference between the alerts $A_{25}$ and $A_{26}$, and directional arrow 2312 represents the number of hops in the data center topology between the alerts $A_{25}$ and $A_{26}$. Note that alerts occurring before the start of the run-time window at $t_{cur} - 4\Delta$, such as alerts 2314 and 2316, are not included in the clustering process.

FIGS. 24-29 show the process of detecting clusters of the alerts in the run-time window based on a MinPts=3 and values selected for $T_\in$, and $K_\in$. The process begins by detecting core alerts in the earliest interval Interval_1. The analytics engine 1508 detects core alerts by counting the number of alerts located within the neighborhood of each alert in Interval_1. Each alert with three or more alerts in the neighborhood of the alert is tagged as a core alert. The analytics engine 1508 assigns the core alerts to clusters of alerts.

Figure 24:
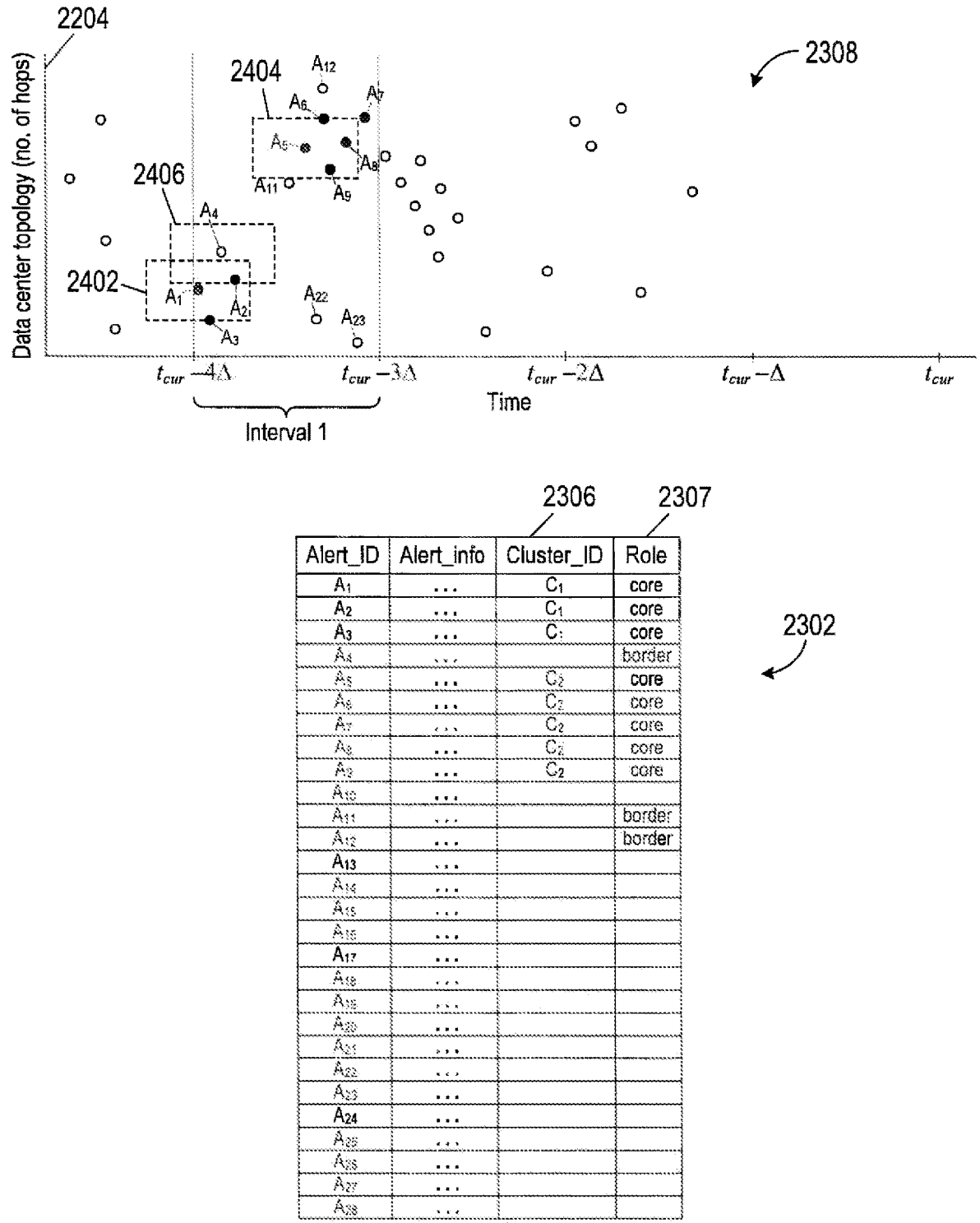
FIGS. 24-29 show the process of detecting clusters of alerts in a run-time window.

FIG. 24 shows an example of core alerts and border alert in the earliest interval Interval_1. Each of the alerts is shown with a corresponding alert ID. Core alerts are identified by dark shading. Border alerts are shown in gray shading. FIG.

24 shows an example of a neighborhood 2402 centered on alert $A_1$. The alerts $A_2$ and $A_3$ are located within the boundaries of the neighborhood 2402. The neighborhood 2402 of the alert $A_1$ contains 3 alerts. As a result, the alert $A_1$ is identified as a core alert. Alerts $A_2$ and $A_3$ are also core alerts with associated neighborhoods that contain 3 or more alerts. FIG. 24 shows an example of a neighborhood 2404 centered on alert $A_5$. The alerts $A_6$, $A_7$, $A_8$, and $A_9$ are located within the boundaries of the neighborhood 2404. The neighborhood of the alert $A_4$ contains 4 alerts. As a result, the alert $A_4$ is identified as a core alert. Alerts $A_6$, $A_7$, $A_8$, and $A_9$ are also core alerts with associated neighborhoods that contain 3 or more alerts. The alerts identified as core alerts in the Interval_1 are labeled as core alerts in column 2307 of the data table 2302. The neighborhood 2404 of the alert $A_4$ contains 2 alerts and is identified as a border alert. Similarly, the alerts $A_{11}$ and $A_{12}$ are identified as border alerts because the neighborhoods of the alerts $A_{11}$ and $A_{12}$ only contain 2 alerts. The alerts identified as border alerts in the Interval_1 are labeled as border alerts in column 2307 of the data table 2302. The core alerts $A_1$, $A_2$, and $A_3$ form a first cluster identified as $C_1$. For example, each of the core alerts is density reachable from one of the other core alerts. In column 3706, the core alerts $A_1$, $A_2$, and $A_3$ are labeled as $C_1$. None of the alerts $A_5$, $A_6$, $A_7$, $A_8$, and $A_9$ is located in a neighborhood of the alerts of the cluster $C_1$ and vis-à-vis. As a result, a second cluster identified as $C_2$ is formed from the alerts $A_5$, $A_6$, $A_7$, $A_8$, and $A_9$. Each of the core alerts is density reachable from one of the other core alerts. In column 3706, the alerts $A_5$, $A_6$, $A_7$, $A_8$, and $A_9$ are labeled as $C_2$.

Figure 25:
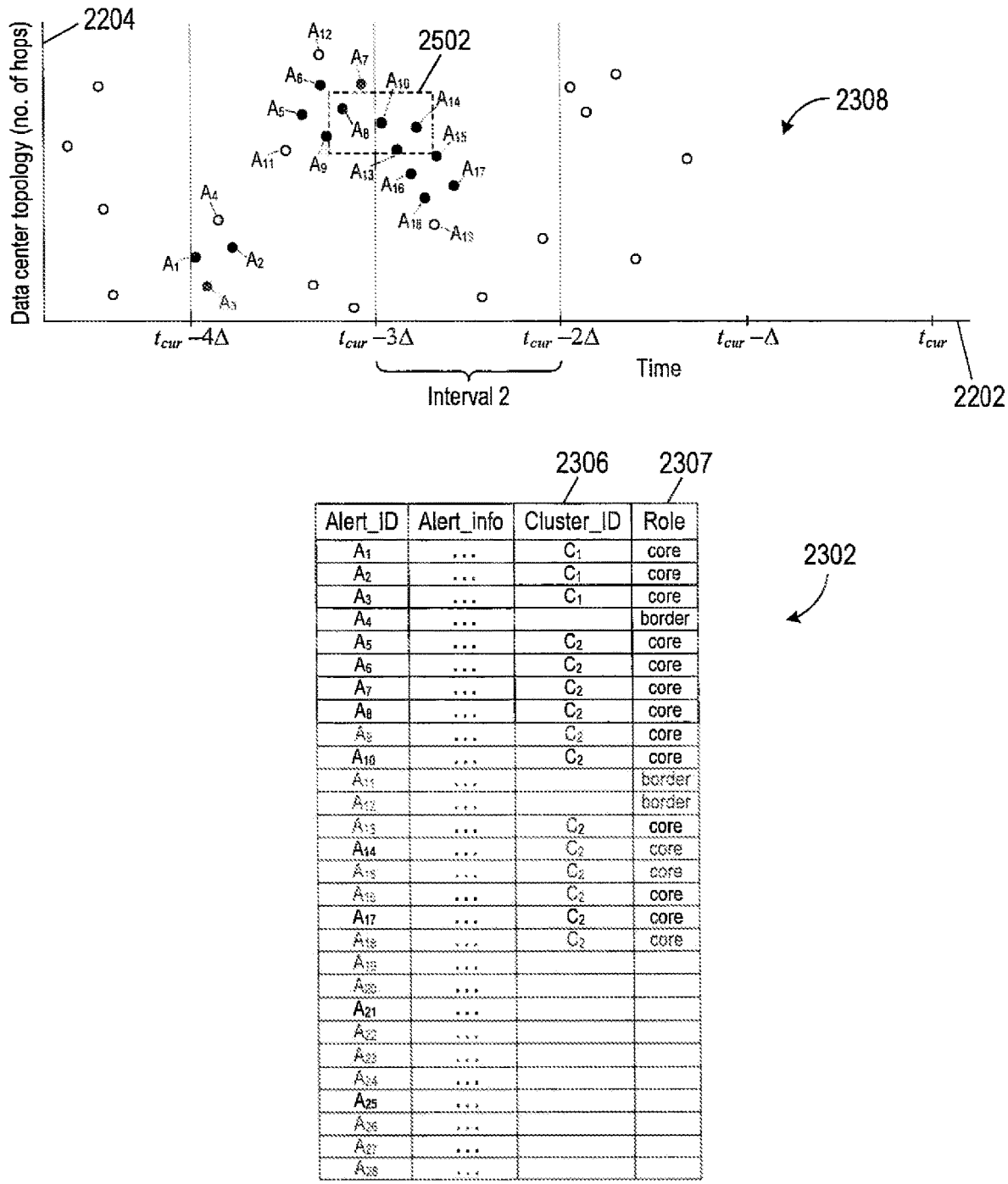

The analytics engine 1508 detects core alerts in the second earliest interval Interval_2. FIG. 25 shows an example of core alerts and a border alert identified in the second earliest interval Interval_2. Each of alerts is labeled with the alert ID. Core alerts are identified by dark shading. FIG. 25 shows an example of a neighborhood 2502 centered on alert $A_{10}$, which contains more than 3 alerts within the neighborhood boundaries. As a result, the alert $A_{10}$ is identified as a core alert. Similarly, alerts $A_{13}$, $A_{14}$, $A_{15}$, $A_{16}$, $A_{17}$, and $A_{18}$ are also core alerts with associated neighborhoods that contain 3 or more alerts. The alerts $A_{10}$, $A_{13}$, $A_{14}$, $A_{15}$, $A_{16}$, $A_{17}$, and $A_{18}$ identified as core alerts in column 2307 of the data table 2302.

Figure 26A:
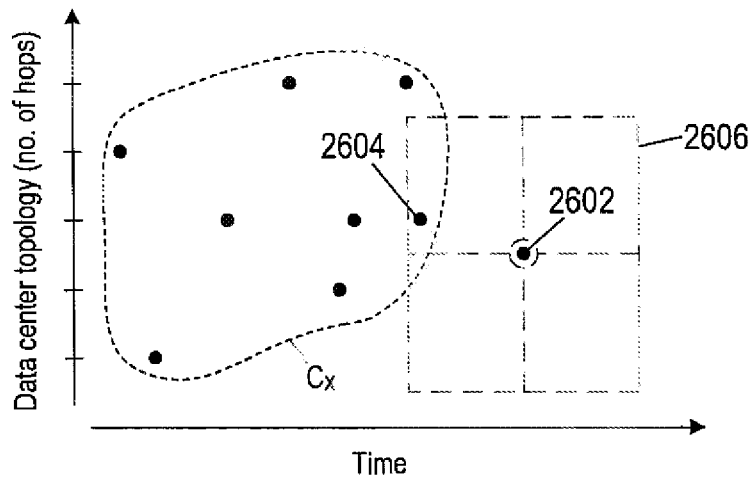
Figure 26B:
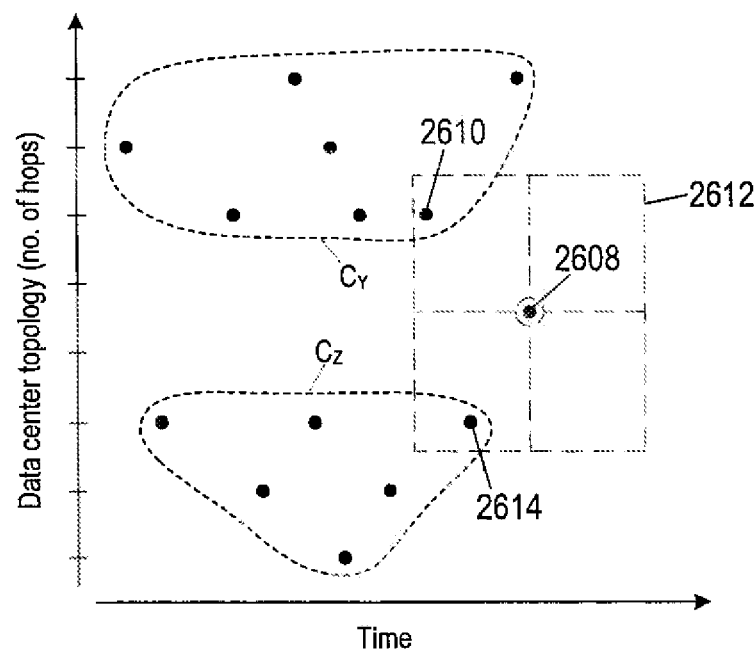

For each core alert in the Interval_2, there are three possible scenarios for determining the cluster ID of a core alert:

1.) The neighborhood of the core alert contains a core alert already assigned a cluster ID. In this case, a core alert is assigned the cluster ID of the neighboring core alert. FIG. 26A shows an example of a new core alert 2602. Core alert 2604 belongs to a cluster of alerts $C_x$ and is in the neighborhood 2606 of the core alert 2602. As a result, new core alert 2602 is assigned to the cluster $C_x$.
2.) The neighborhood of the core alert contains more than one core alert, each having a different a cluster ID. In this case, the clusters of the core alerts already having clusters IDs are merged. The core alert is assigned the cluster ID of the core alert in cluster with the most core alerts. The core alerts of the cluster with fewer core alerts are assigned the cluster ID of the cluster with the most core alerts. FIG. 26B shows an example of new core alert 2608. Core alert 2610 belongs to a cluster of alerts $C_y$ and is in the neighborhood 2612 of the core alert 2608. Core alert 2614 belongs to a cluster of alerts $C_z$ and is also in the neighborhood 2612 of the core alert 2608. Because the cluster $C_y$ has more core alerts than the cluster $C_z$, the core alert 2608 is assigned the cluster ID of the cluster $C_y$ and the cluster Cr is merged with the cluster $C_y$ by assigning the cluster ID of the cluster $C_y$ to the core alerts of the cluster $C_z$.
3.) The neighborhood of the core alert does not contain a core alert with a cluster ID. In this case, a new cluster ID is assigned to the core alert.

Returning to FIG. 25, the neighborhood 2502 of core alert $A_{10}$ contains the core alert $A_8$ of the cluster with cluster ID $C_2$. According to scenario 1.), core alert $A_{10}$ is assigned the cluster ID $C_2$. Because core alerts $A_{13}$, $A_{14}$, $A_{15}$, $A_{16}$, $A_{17}$, and $A_{18}$ are density reachable from the core alert $A_{10}$, the core alerts $A_{13}$, $A_{14}$, $A_{15}$, $A_{16}$, $A_{17}$, and $A_{18}$ are also assigned the cluster ID $C_2$. In column 2306, the core alerts $A_{10}$, $A_{13}$, $A_{14}$, $A_{15}$, $A_{16}$, $A_{17}$, and $A_{18}$ are assigned the cluster ID $C_2$.

The analytics engine 1508 assigns cluster IDs to border alerts in the earliest interval Interval_1. As described above with reference to FIG. 24, alerts $A_4$, $A_{11}$, and $A_{12}$ were identified as border alerts, but were not assigned a cluster ID. An alert in the earliest interval Interval_1 that does not contain another alert in the neighborhood of the alert is identified as noise. Noise alerts are not part of a cluster of alerts and are considered isolated events.

Figure 27:
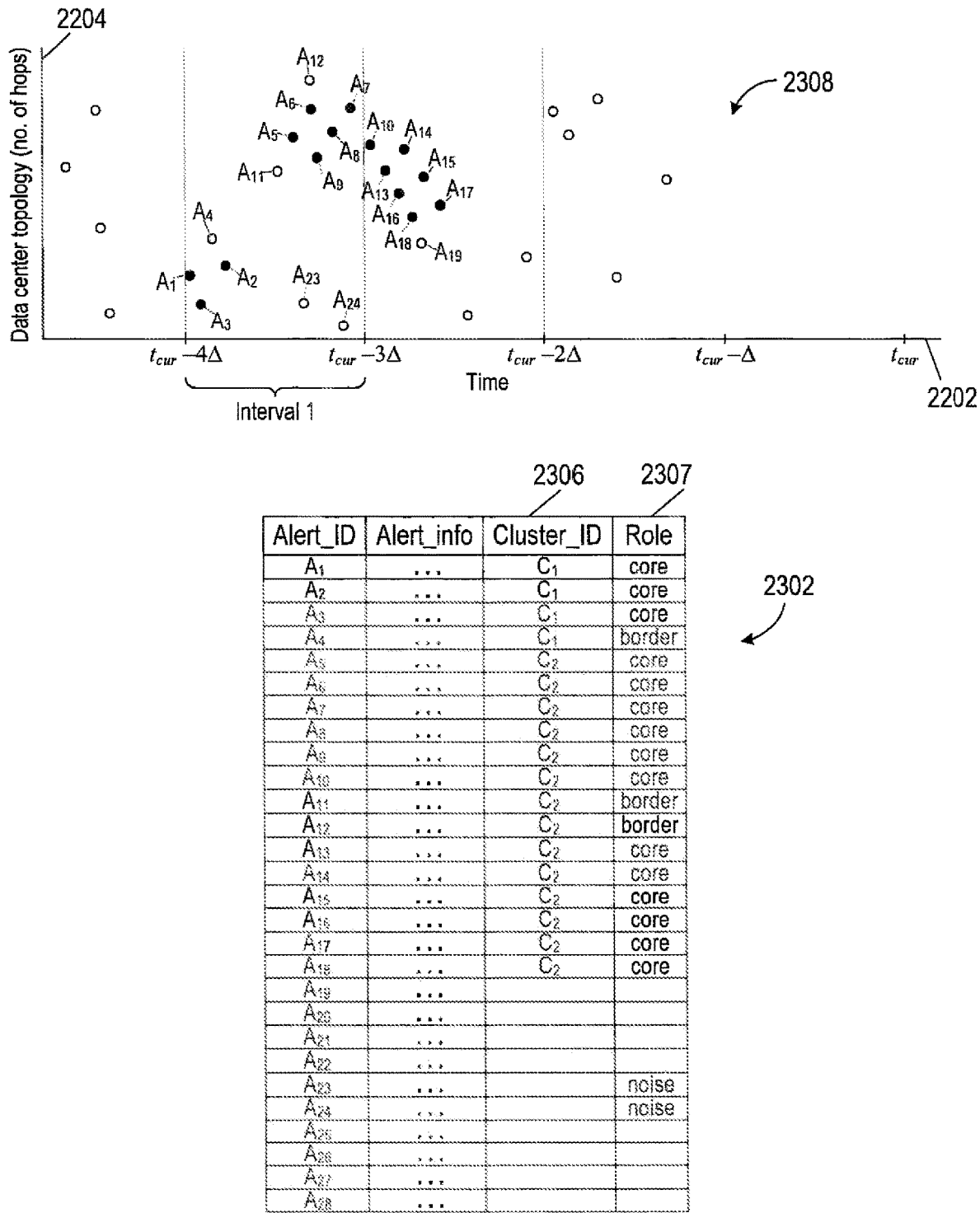

In FIG. 27, the border alert $A_4$ is density reachable from any one of alerts in the cluster $C_1$. As a result, the border alert $A_4$ is labeled with cluster ID $C_1$ in column 2307 of the data table 2302. The border alerts $A_{11}$ and $A_{12}$ are density reachable from any one of the alerts in the cluster $C_2$. As a result, the border alerts $A_{11}$ and $A_{12}$ are labeled with cluster ID $C_2$ in column 2307 of the data table 2302. In FIG. 27, neighborhoods of the alerts $A_{23}$ and $A_{24}$ do not contain additional alerts and are identified as noise. The alerts $A_{23}$ and $A_{24}$ are labeled as noise in column 2307.

Figure 28:
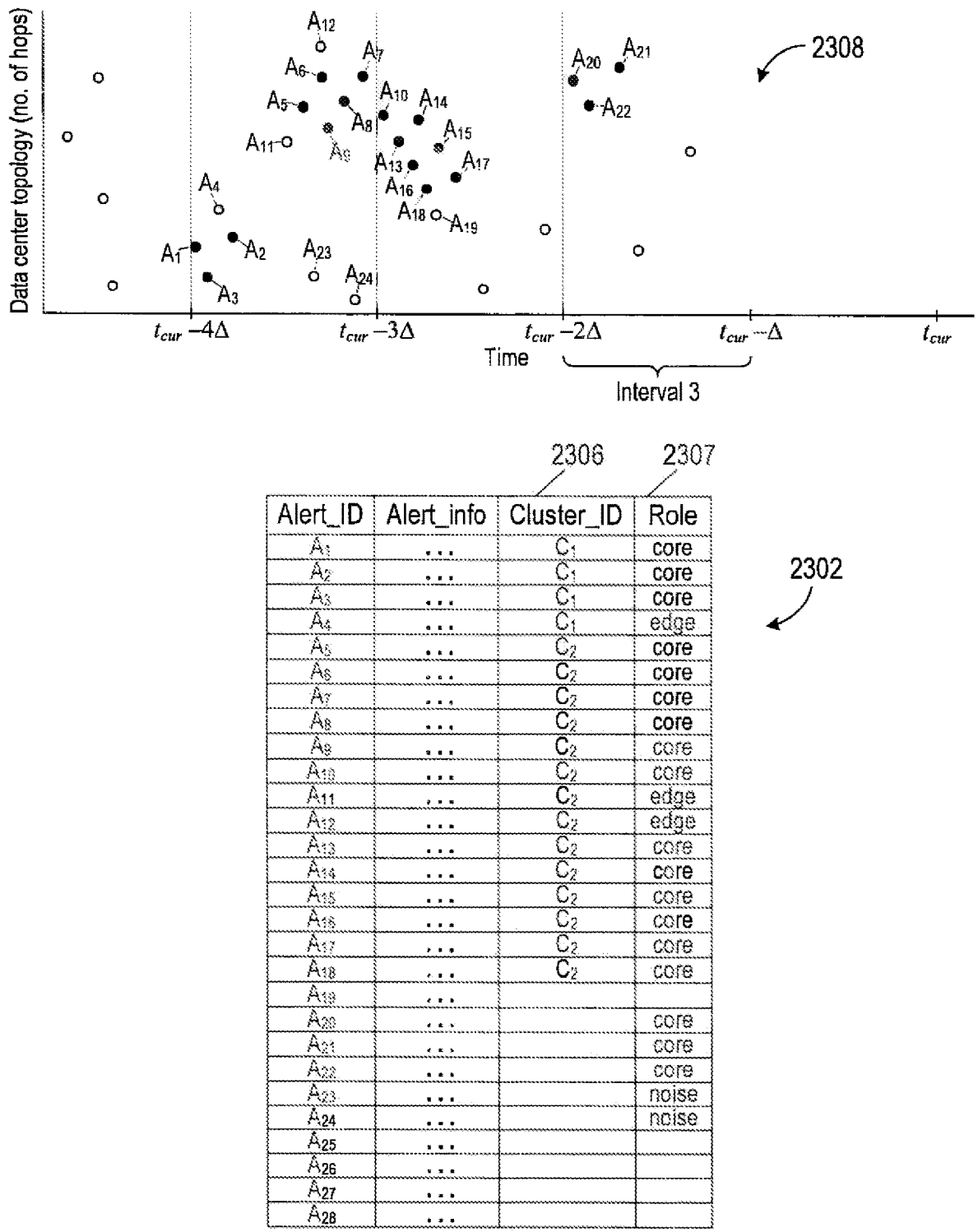

The analytics engine 1508 identifies core alerts in the third earliest interval Interval_3 but does not assign the core alerts to a cluster. FIG. 28 shows an example of core alerts identified in the third earliest interval Interval_3. Each of the alerts is shown with a corresponding alert ID. Neighborhoods of the core alerts $A_{20}$, $A_{21}$, and $A_{22}$ contain 3 core alerts. The alerts $A_{20}$, $A_{21}$, and $A_{22}$ are labeled as core alerts in column 2307. Note that the core alerts are not assigned a cluster ID. Identification of core points in Interval_3 completes border alert detection in Interval_2 because there may be border alerts in Interval_2 that are close to core alerts in Interval_3.

Figure 29:
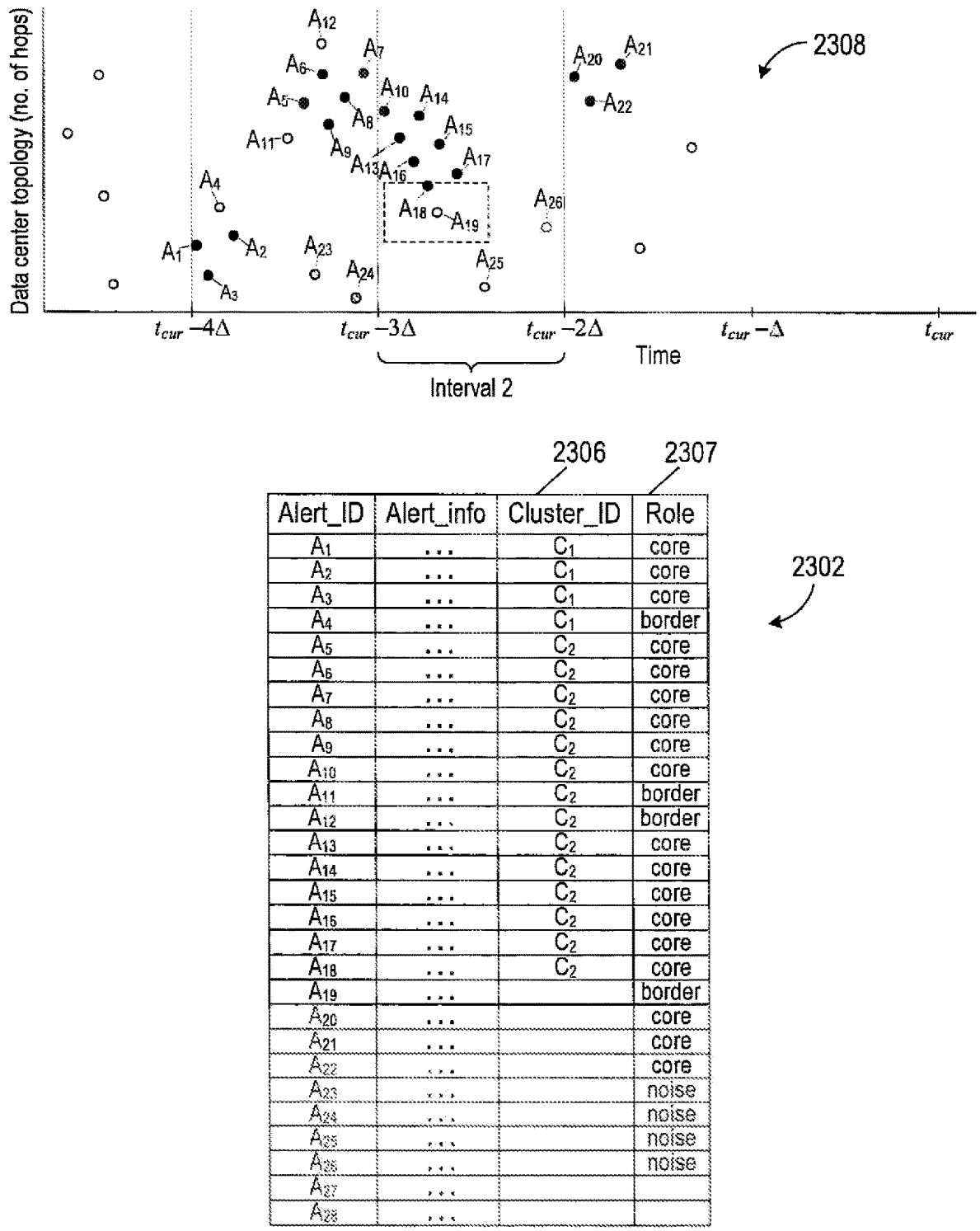

The analytics engine 1508 identifies border alerts and noise in the second earliest interval Interval_2. FIG. 29 shows a neighborhood 2902 of alert $A_{19}$. The neighborhood 2902 contains a total of 2 alerts, one of which is core alert $A_{18}$. The alert $A_{19}$ is identified as a border alert and labeled as a border alert in column 2307 of the data table 2302. In FIG. 29, neighborhoods of the alerts $A_{25}$ and $A_{26}$ do not contain additional alerts and are identified as noise. The alerts $A_{23}$% and $A_{25}$ are labeled as noise in column 2307.

Figure 30:
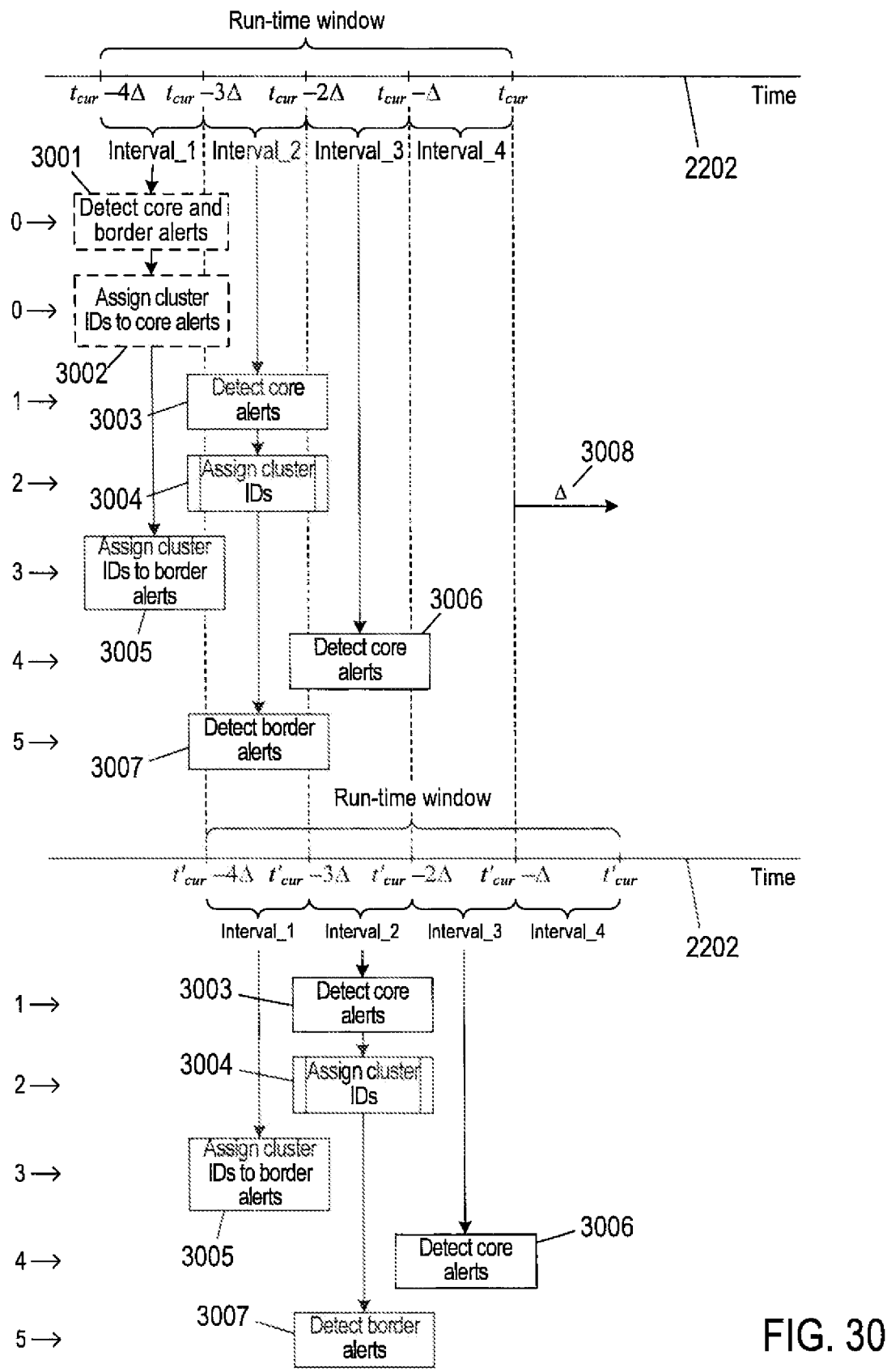
FIG. 30 shows an example of a process of identifying clusters of alerts in a sliding run-time window.

FIG. 30 shows an example of a process of identifying clusters of alerts in a sliding run-time window described above. Blocks 3001 and 3002 represent initial processes that are performed at the beginning of the sliding run-time window. In block 3001, core and border alerts are detected as described above with reference to FIG. 24. In block 3002, a cluster ID is assigned to each cluster of alerts detected in Interval_1 as described above with reference to FIG. 24. In block 3003, core alerts are detected in Interval_2 as described above with reference to FIG. 25. In block 3004, a "assign cluster ID" process is performed. The "assign cluster ID" process assigns cluster IDs based to core alerts as described above with reference to FIGS. 26A-26B. In block

3005, cluster IDs are assigned to the border alerts in Interval_1 as described above with reference to FIG. 27. In block 3006, core alerts are detected in Interval_3 as described above with reference to FIG. 28. In block 3007, border alerts are detected in interval_2 as described above with reference to FIG. 29. As shown in FIG. 30, when the time Δ as elapsed, the run-time window is moved in time by Δ as indicated by directional arrow 3008. The computational operations represented by blocks 3003-3007 are repeated for alerts in time intervals of a new location of the run-time window that ends at time $t'_{cur}$ and begins at start time $t'_{cur}-4\Delta$. Note that operations represented by blocks 3003-3007 are repeated for alerts in new Interval_1, Interval_2, and Interval_3 which correspond to previous Interval_2, Interval_3, and Interval_4.

The analytics engine 1508 also executes time evolution clustering of alerts and coverage evolution of alerts as batch processes. These batch processes are performed on historical alerts recorded in the alerts database 1513 and on alerts up to the current time $t_{cur}$.

The analytics engine 1508 performs time evolution clustering by sorting the alerts recorded in a historical time period from earliest to latest. The analytics engine 1508 identifies a first alert $A(t_1)$ as first incident member and detects other alerts that should be grouped with the alert $A(t_1)$ to grow the incident. Starting from the next earliest alert $A(t_2)$, if the alert $A(t_2)$ is in time and topology proximity with each of the alerts of an incident, the alert $A(t_2)$ is added to the incident.

Figure 31:
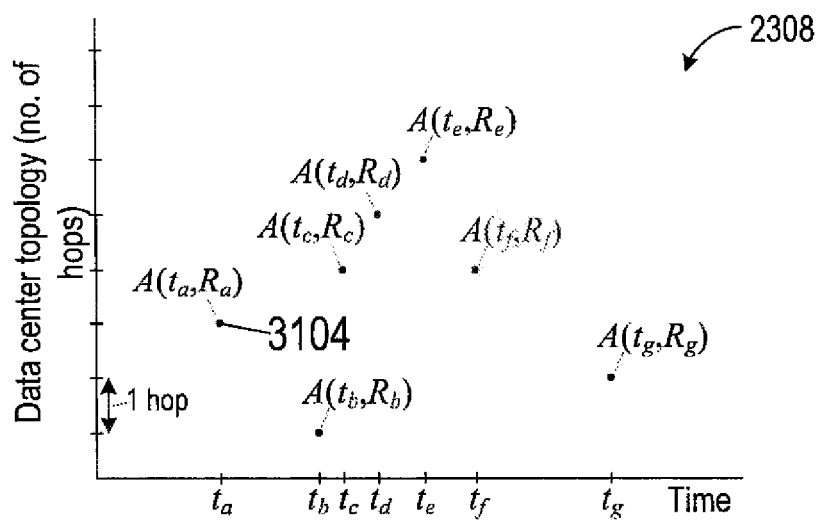
FIG. 31 shows a plot of example seven alerts.

Consider the example seven alerts list in the table 1902 stored in the alerts database 1513 of FIG. 19. The analytics engine 1508 sorts the seven alerts based on time from the earliest to the most recent. FIG. 31 shows a plot 3102 of the example seven alerts. The analytics engine 1508 identifies the earliest alert, $A(t_\alpha, R_\alpha)$, 3104 as an incident and tries to grow the incident by determining whether neighborhoods of each of the other alerts lie within a neighborhood of the alert $A(t_\alpha, R_\alpha)$.

Figure 32A:
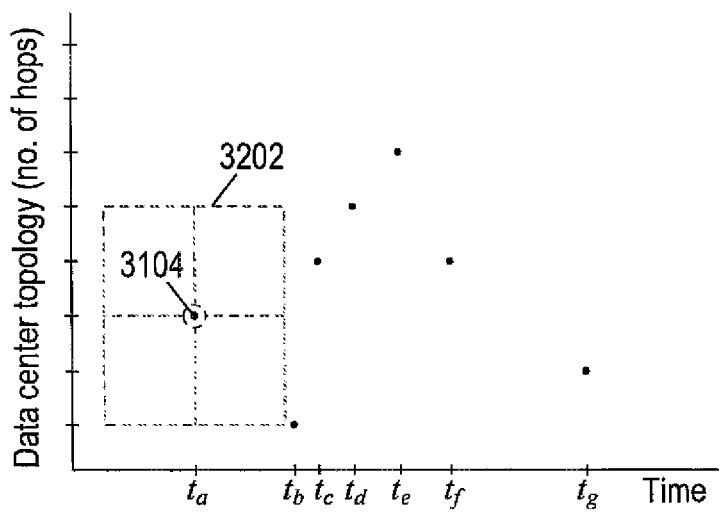
FIGS. 32A-32G show an example of growing an incident from alerts using time evolution.
Figure 32C:
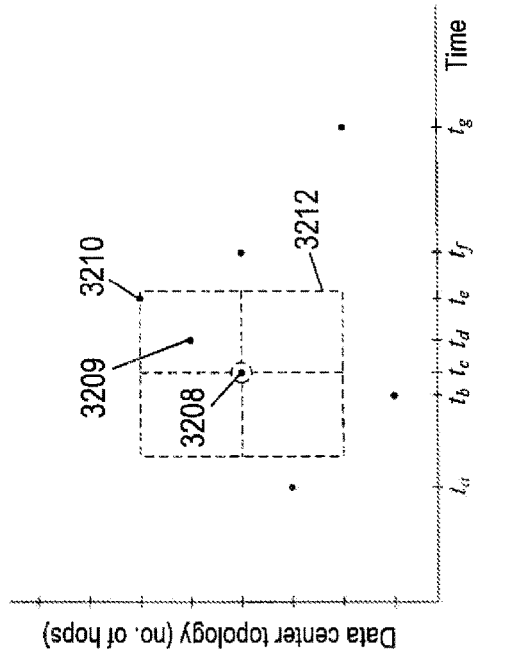
Figure 32E:
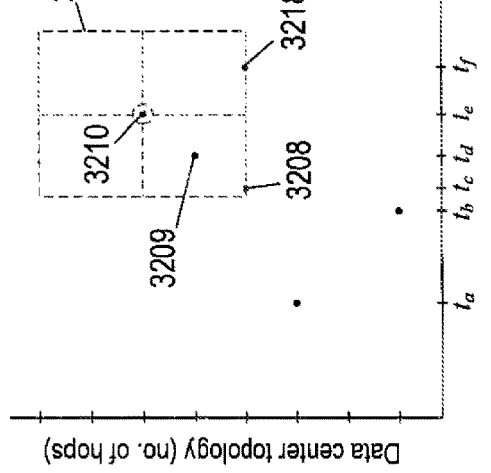
Figure 32B:
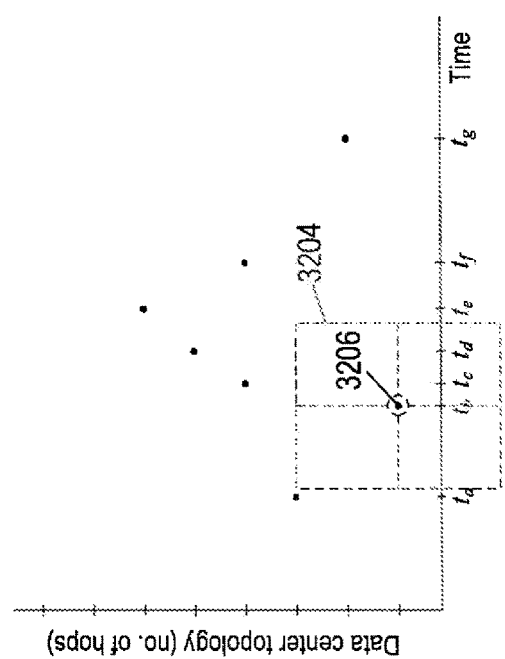
Figure 32D:
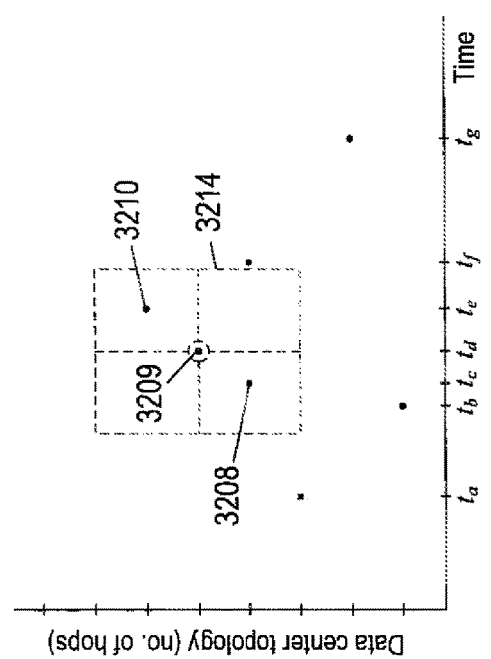
Figure 32G:
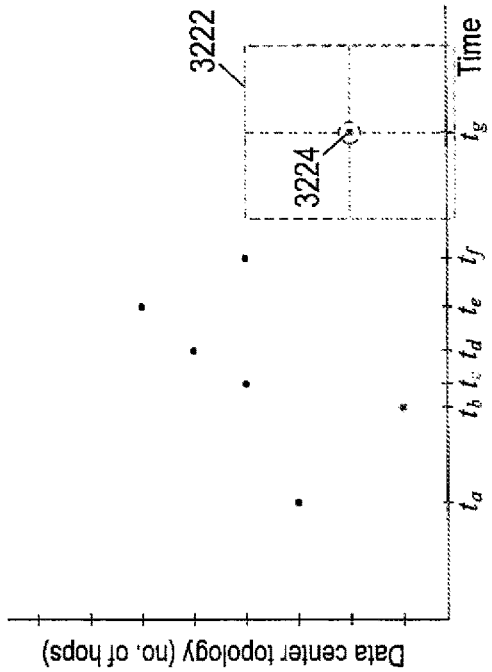
Figure 32F:
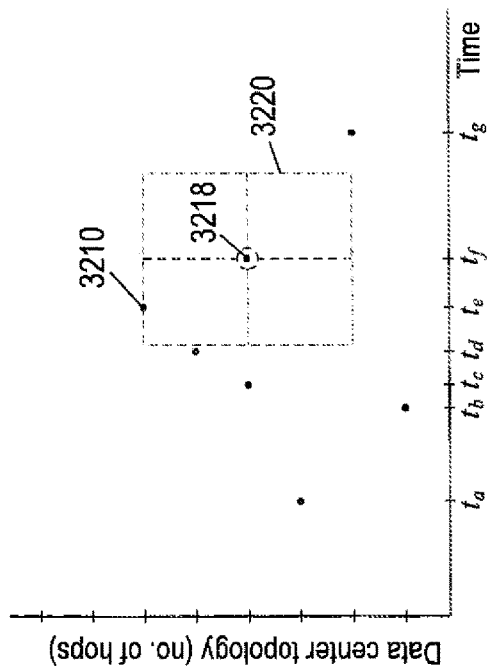

FIGS. 32A-32G show an example of growing an incident from alerts using time evolution. In FIG. 32A, a neighborhood 3202 centered at the alert 3104 does not include other alerts. As a result, the alert 3104 is identified as an isolated incident. In FIG. 32B, a neighborhood 3204 centered at the alert 3206 does not include other alerts. As a result, the alert 3206 is identified as an isolated incident. FIGS. 32C-32E illustrate growing an incident from the alert 3208 to include the alerts 3209 and 3210. In FIG. 32C, a neighborhood 3212 centered at the alert 3208 encompasses the alerts 3209 and 3210. In FIG. 32D, a neighborhood 3214 centered at the alert 3209 encompasses the alerts 3208 and 3210. As a result, the incident has grown from alert 3208 to include the alert 3209. In FIG. 32E, a neighborhood 3216 centered at the alert 3210 encompasses the alerts 3208 and 3209. As a result, the incident has grown from alerts 3208 and 3209 to include the alert 3210. Note that the neighborhood 3216 also includes an alert 3218. However, as shown in FIG. 32F, a neighborhood 3220 centered at alert 3218 only contains the alert 3210 and does not contain the other two alerts 3208 and 3209. As a result, the incident is not expanded to include the alert 3218. In FIG. 32A, a neighborhood 3222 centered at the alert 3224 does not include other alerts. As a result, the alert 3224 is identified as an isolated incident.

Figure 33:
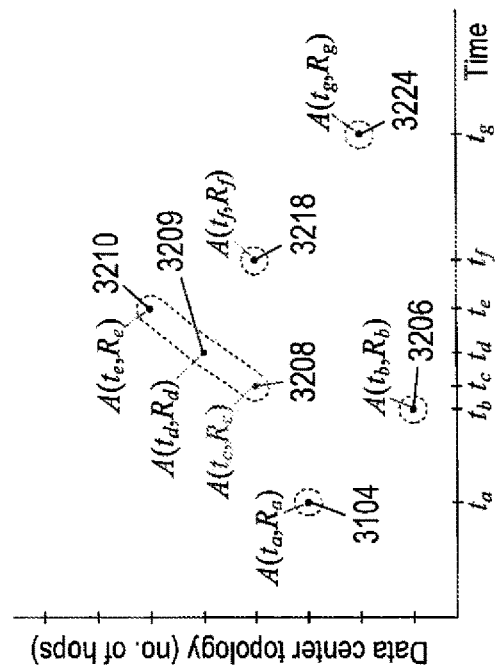
FIG. 33 show the five incidents identified in FIGS. 32A-32G.

FIG. 33 show the five incidents identified in FIGS. 32A-32G. Four incidents are associated with isolated alerts and are identified as noise. Another incident contains three the alerts 3208-3210.

The analytics engine 1508 performs coverage evolution by determining the local density degree of alerts in the neighborhood associated with each alert. The density degree is a count of the number of alerts contained within the neighborhood centered at an alert. The alert having the largest density degree is identified. In case of more than one alert having that same density degree, the neighborhood associated with the earlier is identified. The alerts within the neighborhood with the largest density degree are identified as a cluster and assigned a cluster ID. Alerts with the second largest density degree are identified as a cluster and assigned a cluster ID. Note that alerts common to the first and second clusters are assigned to the first cluster. In other words, the second cluster is composed of the remaining alerts after the alerts have been assigned to the first cluster.

Figure 34A:
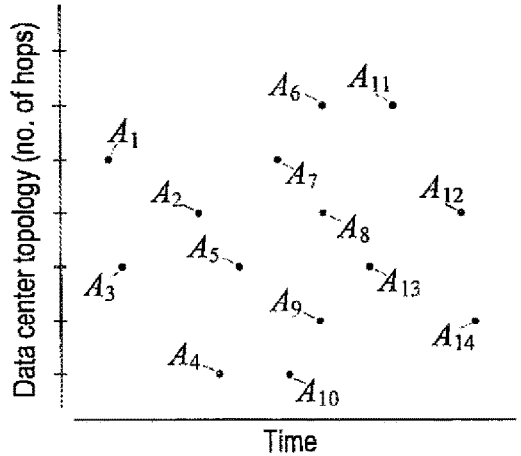
FIGS. 34A-34C show an example of identifying clusters using coverage evolution.
Figure 34B:
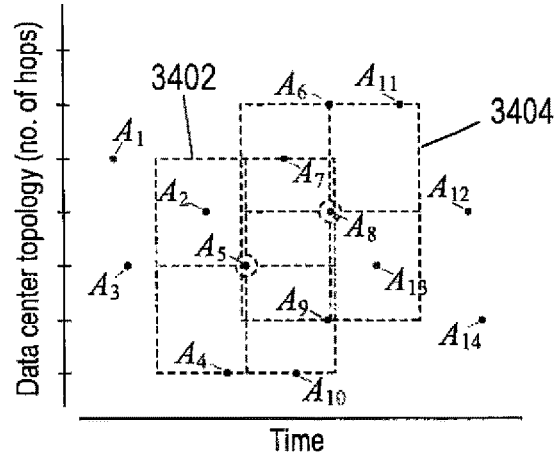
Figure 34C:
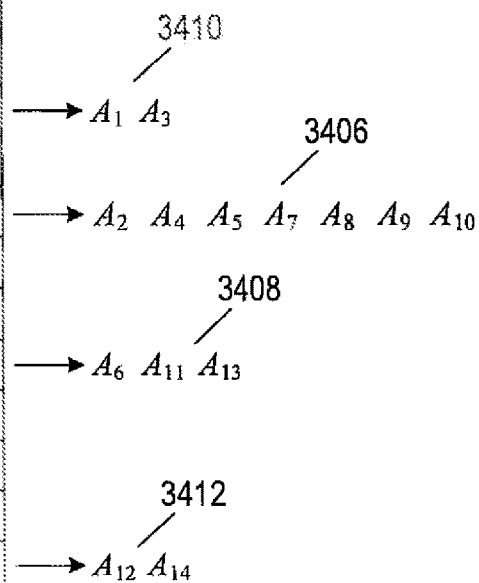

FIGS. 34A-34C show an example identifying clusters using coverage evolution. FIG. 34A shows an example of 14 alerts occurring in a historical time period. For each alert, the analytics engine 1508 identifies and counts the alerts in the neighborhood of each alert. FIG. 34B shows a neighborhood 3402 centered on alert $A_5$. In this example, the neighborhood 3402 contains 7 alerts: $A_2, A_4, A_5, A_7, A_8, A_9$, and $A_{10}$. As a result, the alert $A_5$ has a density degree of 7. The neighborhood 3404 centered on alert $A_5$ contains 7 alerts: $A_5, A_6, A_7, A_8, A_9, A_{11}$, and $A_{13}$. As a result, the alert $A_8$ has a density degree of 7. FIG. 34C shows a table of density degrees for the alerts shown in FIG. 34A. Alerts $A_5$ and $A_8$ have the same largest density degrees of 7. In this example, the alert $A_5$ has an earlier start time than the alert $A_8$. A first cluster 3406 $C_1$ is formed from the alerts located within the neighborhood 3402. A second cluster 3408 $C_2$ is formed from the alerts in the neighborhood 3404, excluding the alerts that are located with the first cluster $C_1$. Cluster $C_3$ 3410 and cluster $C_4$ 3412 are formed from the remaining alerts in neighborhoods of the alerts $A_1$ and $A_{12}$.

The analytics engine 1508 reports the cluster of alerts to the user interface 1502. The user interface 1502 displays the events associated with the clusters of alerts in a graphical user interface ("GUI") that is displayed on an electronic visual display, such as system administrator console. The GUI enables a user to view the events that started the clusters of alerts.

FIGS. 35A-35C show examples of GUIs that display events associated with different clusters of alerts. FIG. 35A shows a GUI that displays three different incidents identified as Incident 1. Incident 2, and Incident 3. The analytics engine 1508 detected a cluster of 51 alerts 3502 associated with Incident 1, detected a cluster of 10 alerts 3504 associated with Incident 2, and detected cluster of 3 alerts 3506 associated with Incident 3. In this example, a user has expanded Incident 1 to view three events 3508-3510 that created the three alerts. FIG. 35B shows a GUI that displays a single Incident 10. The analytics engine 1508 detected a cluster of 54 alerts 3512 associated with Incident 10. In this example, a user has expanded Incident 10 to view the events. In this example, only three events 3514-3516 of the 54 alerts are shown for the sake of brevity. FIG. 35C shows a GUI that displays two different incidents identified as Incident 18 and Incident 19. The analytics engine 1508 detected a cluster of 41 alerts 3514 associated with Incident 18 and detected a cluster of 10 alerts 3516 associated with Incident 19. In this example, only three events 3522-3525 of the 10 alerts are shown for the sake of brevity.

Note that the GUIs shown in FIGS. 35A-35C include a column that indicates the priority of the alert associated with the events displayed. For example, event 3509 in FIG. 35A is identified as high priority and event 3524 in FIG. 35C is also identified as high priority. The analytics engine 1508 determines whether an event is high priority based on the fraction of alerts in a cluster of alerts that correspond to the event as described below with reference to FIG. 40.

Figure 35D:
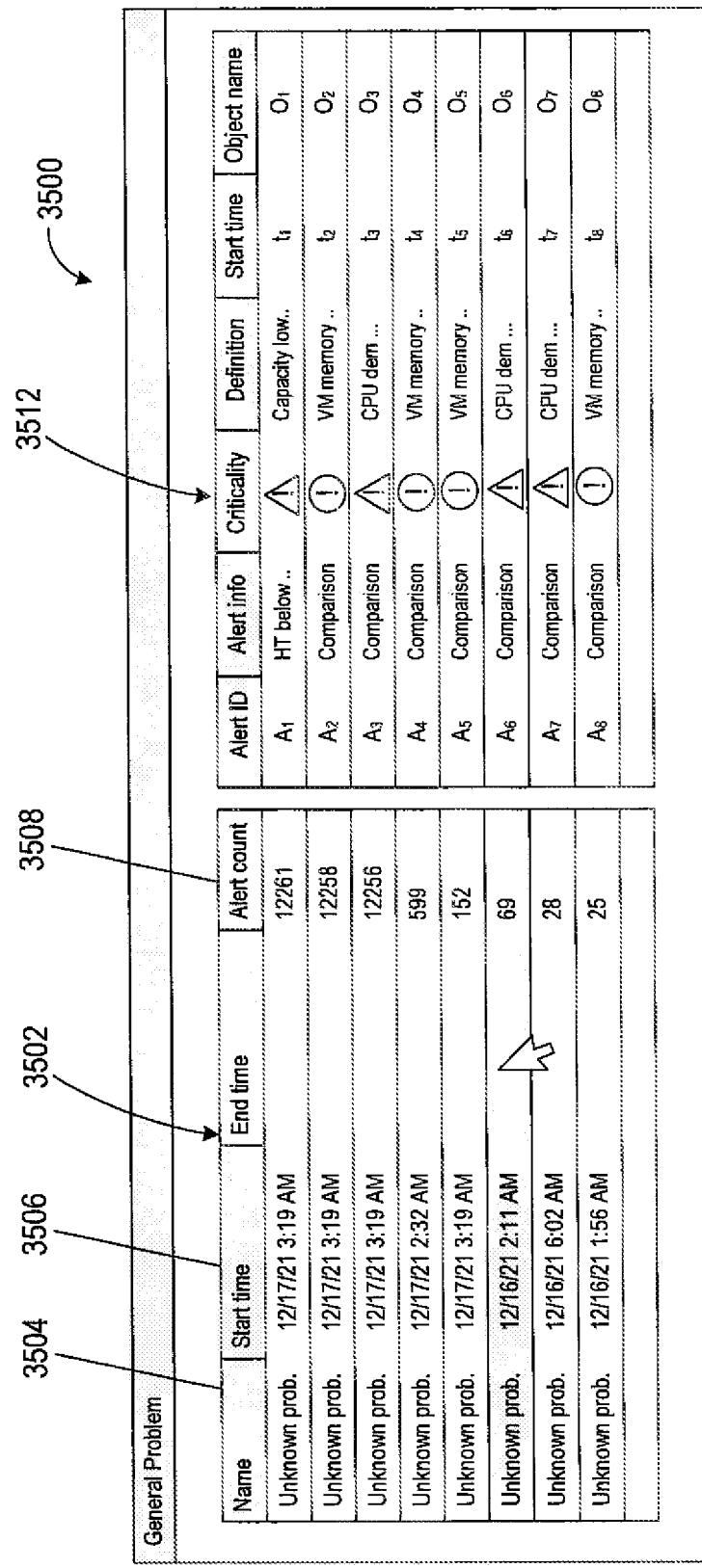

The analytics engine 1508 also discovers clusters of alerts that correspond to unknown incidents. FIG. 35D shows a GUI 3500 that displays a list of unknown incidents in pane 3502. The incidents are identified as unknown problems in column 3504, the start times are given in column 3506, and a count of the alerts in the cluster of alerts of each incident are listed in column 3508. In this example, a user clicks on highlighted incident 3510, which creates a display of the 69 alerts in a cluster of alerts that correspond to the incident and alert information in pane 3512.

The clusters of alerts detected by the analytics engine 1508 in a sliding run-time window are dynamic. Any relevant insights may have static fields and subfields and dynamic fields and subfields. As described above, when a cluster of alerts is detected, the cluster is assigned a static cluster ID that does not change during the lifetime of the underlying events. The cluster ID can be a subfield of a title for the cluster.

Figure 36A:
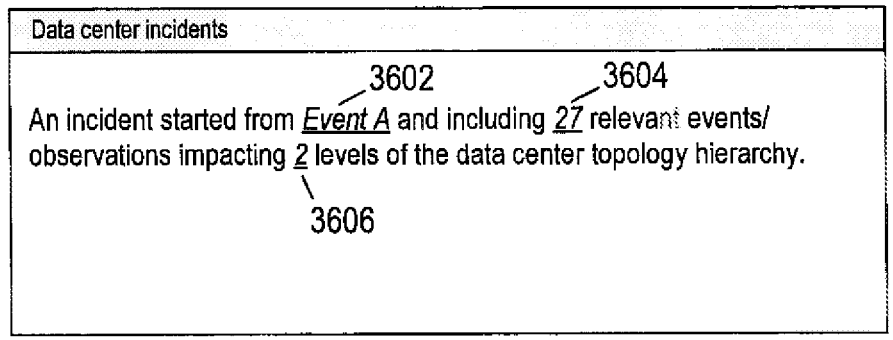
FIGS. 36A-36B show examples of titles displayed in a GUI that aid a user with identifying an event at the beginning of a cluster of alerts.
Figure 36B:
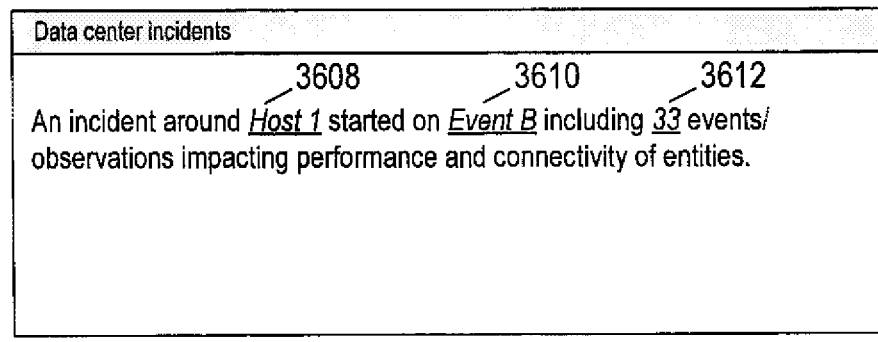

FIGS. 36A-36B show examples of titles displayed in a GUI that aid a user with identifying the incidents associated with clusters of alerts. In FIG. 36A, a field 3602 identifies an event 3602, which corresponds to the first core alert detected by the process described above. A field 3604 gives the number of events associated with the different alerts in the cluster of alerts. A field 3606 identifies the number of levels of the data center topological hierarchy impacted by the events. In FIG. 36B, a field 3608 identifies a data center object and a field 3610 and a field identifies an event 3612, which corresponds to the first core alert detected by the process described above. A field 3614 gives the number of events associated with the different alerts in the cluster of alerts.

The methods described below with reference to FIGS. 37-41 are stored in one or more data-storage devices as machine-readable instructions and are executed by one or more processors of a computer system, such as the computer system shown in FIG. 1. The computer-implemented process described below eliminates human errors in discovering incidents and the events that created the incidents that impact the performance of objects executing in the data center. The processes significantly reduce the amount time spent discovering related events from days and weeks to minutes and seconds, thereby providing immediate notification to users.

Figure 37:
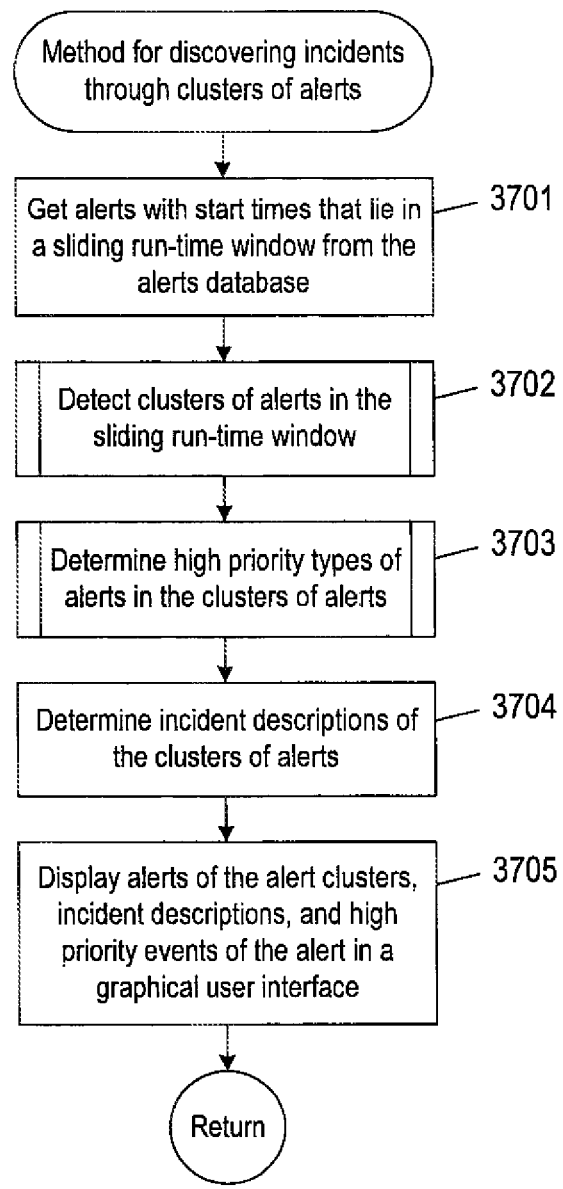
FIG. 37 is a flow diagram of a method for discovering incidents through clusters of alerts.

FIG. 37 is a flow diagram of a method for discovering incidents through clusters of alerts. In block 3701, alerts with start times that lie in a sliding run-time window are retrieved from an alerts database. Each alert corresponds to an abnormal run-time event occurring with an object executing in the data center. In block 3702, a "detect clusters of alerts in a sliding run-time window" procedure is performed. An example implementation of the "detect clusters of alerts in a sliding run-time window" is described below with reference to FIG. 38. In block 3703, a "determine high priority types of alerts in the clusters of alerts" procedure is performed. An example implementation of the "determine high priority types of alerts in the clusters of alerts" is described below with reference to FIG. 40. In block 3704, incident descriptions of the alerts are determined as described above with reference to FIGS. 36A-36B. In block 3705, alerts of the clusters of alerts, incident descriptions, and high priority events of alerts are displayed in a graphical user interface as described above with reference to FIGS. 35A-36B.

Figure 38:
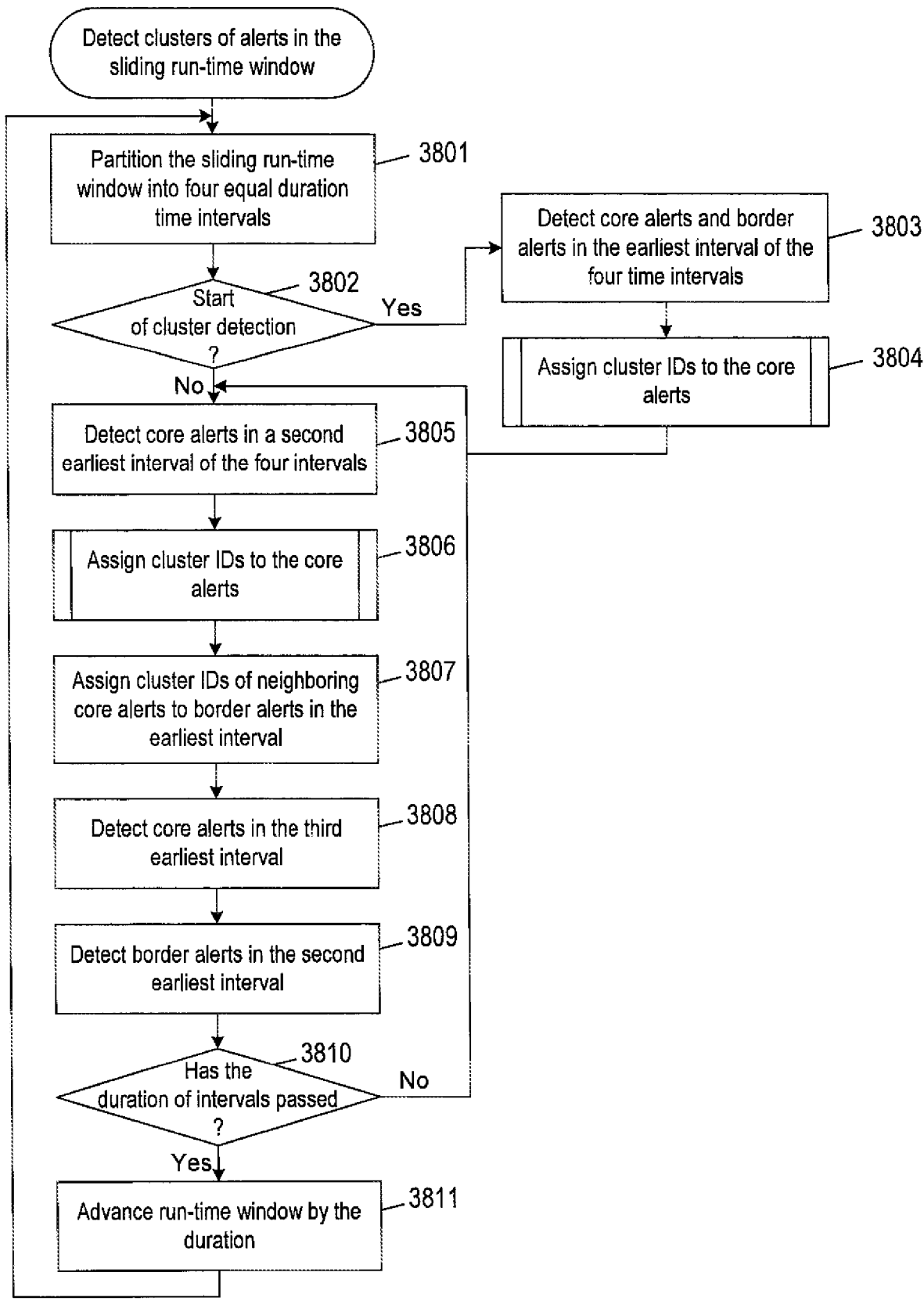
FIG. 38 is a flow diagram illustrating an example implementation of the "detect clusters of alerts in a sliding run-time window" procedure performed in FIG. 37.

FIG. 38 is a flow diagram illustrating an example implementation of the "detect clusters of alerts in a sliding run-time window" procedure performed in block 3702 of FIG. 37. In block 3801, the sliding run-time window is partitioned into four equal duration time intervals as described above with reference to FIG. 22. In decision block 3802, if the process of detecting clusters of alerts is starting, control flows to 3803 as described above with reference to FIGS. 24 and 30. In block 3803, core alerts and border alerts in the earliest interval of the four time intervals are detected as described above with reference to FIG. 24. In block 3804, an "assign cluster IDs to the core alerts" procedure is performed. An example implementation of the "assign cluster IDs to the core alerts" is described below with reference to FIG. 39. In block 3805, core alerts in a second earliest time interval of the four time intervals are detected as described above with reference to FIG. 25. In block 3806, the "assign cluster IDs to the core alerts" procedure is performed. In block 3807, cluster IDs of neighboring core alerts are assigned to border alerts in the earliest interval as described above with reference to FIG. 27. In block 3808, core alerts in the third earliest interval of the four time intervals are detected as described above with reference to FIG. 28. In block 3809, border alerts in the second earliest interval are detected as described above with reference to FIG. 29. In decision block 3810, when the duration of the time intervals has elapsed, control flow to block 3811. In block 3811, the slide run-time window advanced by the duration as described above with reference to FIG. 30.

Figure 39:
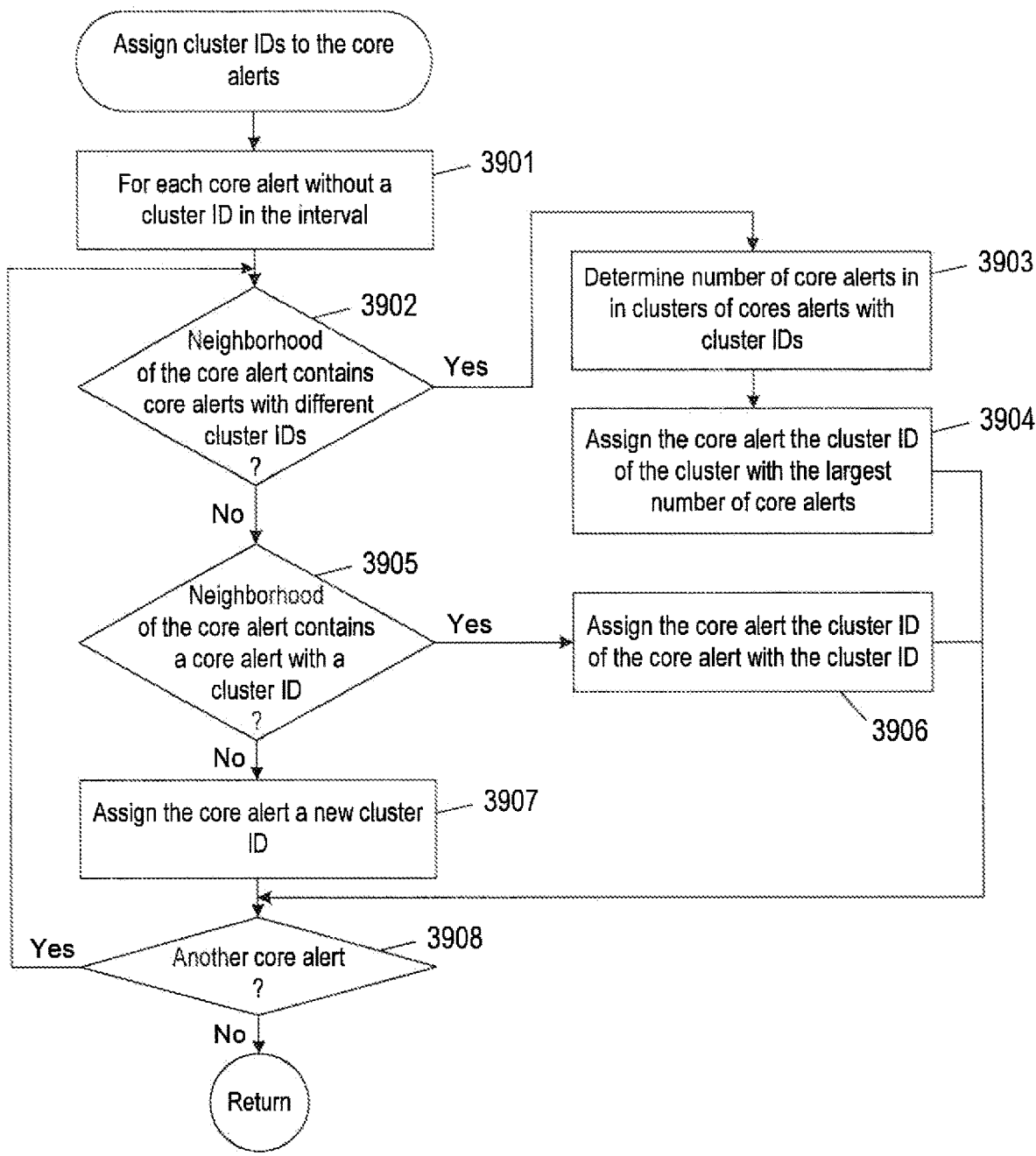
FIG. 39 is a flow diagram illustrating an example implementation of the "assign cluster IDs to the core alerts" procedure performed in FIG. 38.

FIG. 39 is a flow diagram illustrating an example implementation of the "assign cluster IDs to the core alerts" procedure performed in block 3806 of FIG. 38. A loop beginning with block 3901 repeats the computational operations represented by blocks 3902-3907 for each core alert. In decision block 3902, when the neighborhood of the core alert contains two or more core alerts of clusters of alerts with cluster IDs, as described above with reference to FIG. 26B, control flows to block 3903. In block 3903, the number of core alerts in each cluster of alerts with a core alert in the neighborhood of the core alert is determined as described above with reference to FIG. 26B. In block 3904, the core alert is assigned the cluster ID of the cluster of alerts with the largest number of core alerts. In decision block 3905, when the neighborhood of the core alert contains a core alert of a cluster of alerts with a cluster ID, as described above with reference to FIG. 26A, control flows to block 3906. In block 3906, the core alert is assigned the cluster ID of the cluster of alerts. In block 3907, the core alert is assigned a new cluster ID. In decision block 3908, operations represented by blocks 3902-3907 are repeated for another alert.

Figure 40:
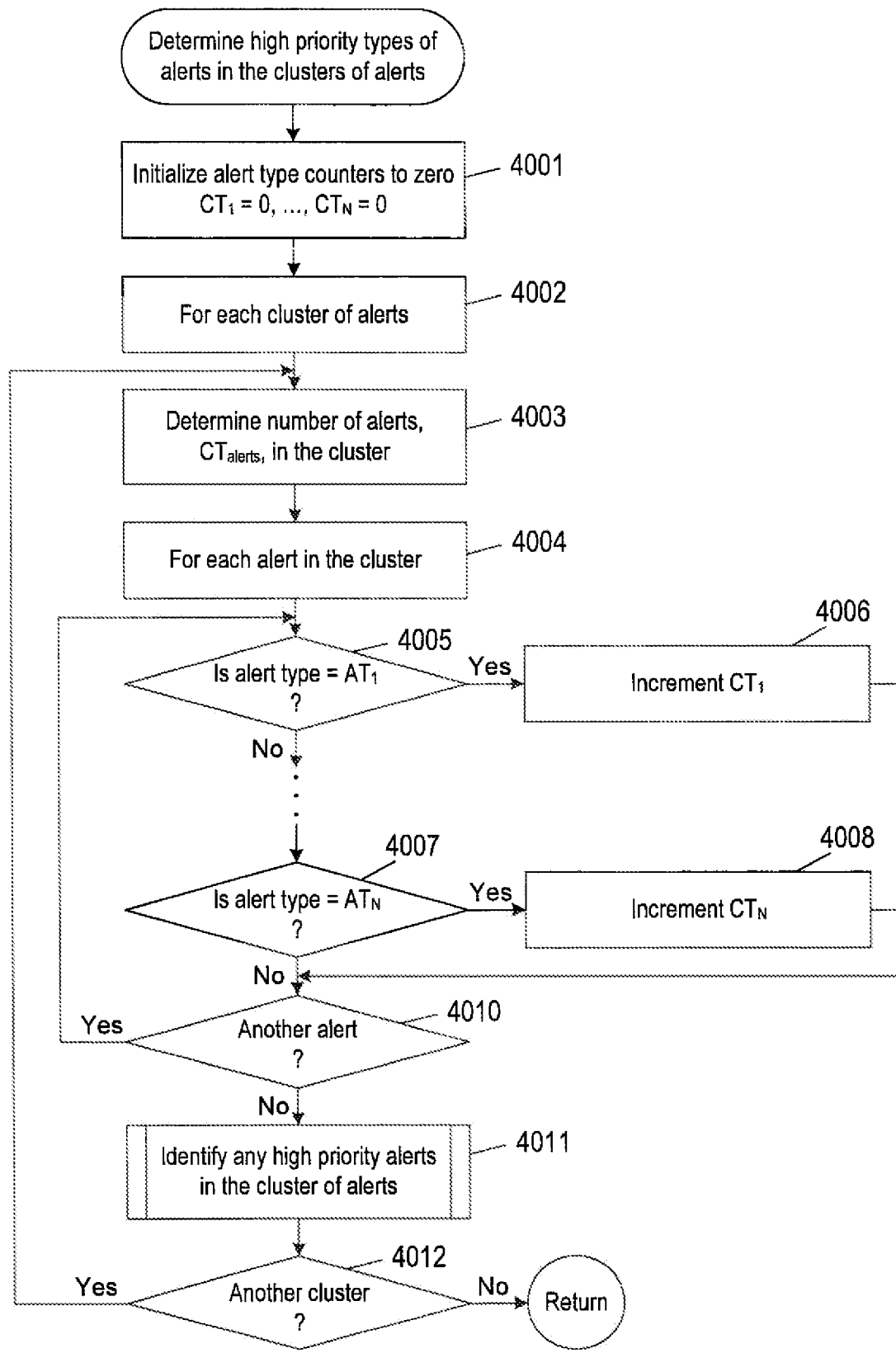
FIG. 40 is a flow diagram illustrating an example implementation of the "determine high priority types of alerts in the clusters of alerts" procedure performed in FIG. 37.

FIG. 40 is a flow diagram illustrating an example implementation of the "determine high priority types of alerts in the clusters of alerts" procedure performed in block 3703 of FIG. 37. In block 4001, alert type counters. $CT_i$, where $i=1, \ldots, N$ and N is the number of alert types, are initialized to zero. A loop beginning with block 4002 repeats the computational operations represented by blocks 4003-4010 for each cluster of alerts. In block 4003, the number of alerts in the cluster, $CT_{alerts}$, is obtained. A loop beginning with block 4004 repeats the operations represented by blocks 4005-4008 for each alert in the cluster of alerts. For the sake of brevity only two of N decision blocks, decision blocks 4005 and 4007, for identifying the alert type of the alert are represented. The "alert type" refers to type of event that has taken place. For example, an alert type can be an alert triggered as a result of a CPU, memory, or KPI threshold violation described above. Decision blocks associated with other alert types are indicated by ellipsis 4009. In decision block 4005, when the alert type correspond to $AT_1$, where $AT_1$ may, for example, represent a CPU usage violation, control flow to block 4006. In block 4006, the counter $CT_1$ is incremented. In decision block 4007, when the alert type correspond to $AT_N$, where $AT_N$ may, for example, represent a KPI threshold violation, control flow to block 4008. In block 4008, the counter $CT_N$ is incremented. In decision block 4010, the operations represented by block 40054009 are repeated for another alert type. In block 4011, an "identify any high priority alerts in the cluster of alerts" procedure is performed. An example implementation of the "identify any high priority alerts in the cluster of alerts" is described below with reference to FIG. 41. In decision block 4012, when another cluster of alerts has been detected, the computational operations represented by blocks 4003-4011 are repeated.

Figure 41:
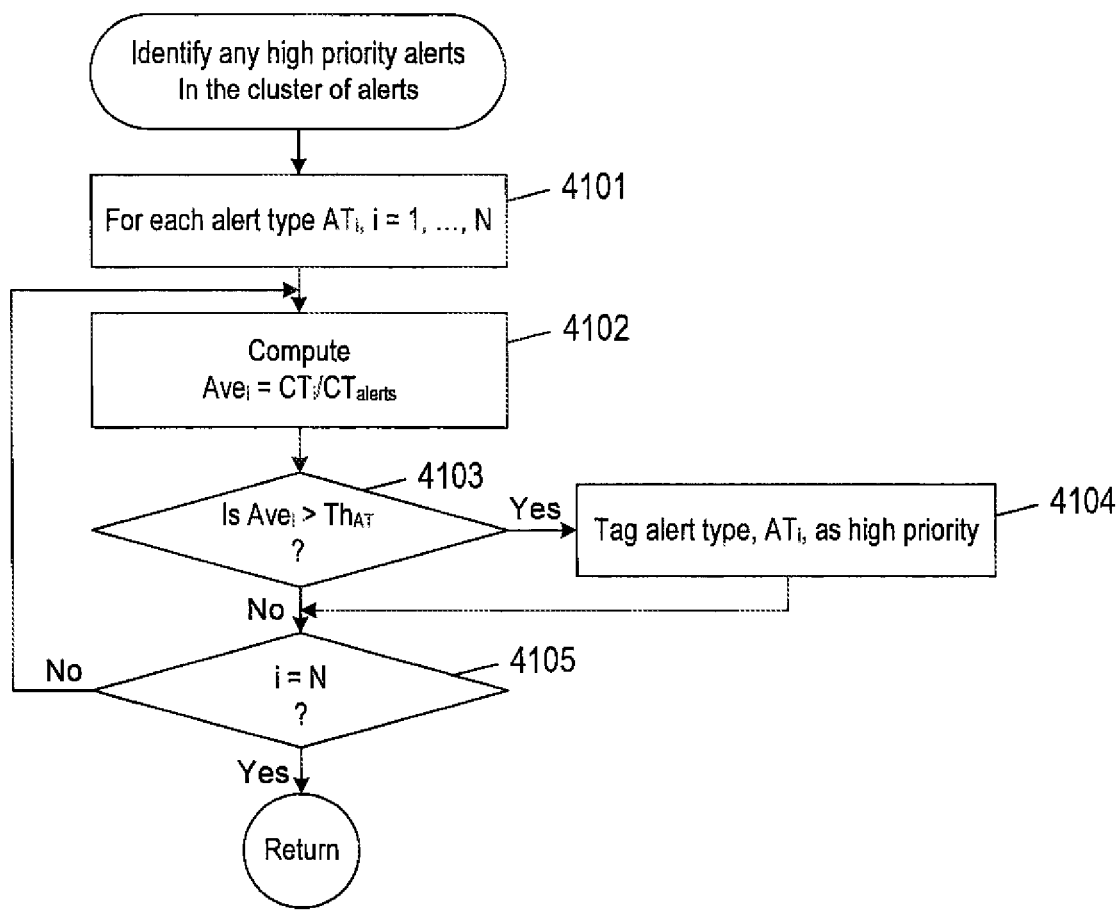
FIG. 41 is a flow diagram illustrating an example implementation of the "identify any high priority alerts in the cluster of alerts" procedure performed in FIG. 40.

FIG. 41 is a flow diagram illustrating an example implementation of the "identify any high priority alerts in the cluster of alerts" procedure performed in block 4010 of FIG. 40. A loop beginning with block 4101 repeats the computational operations represented by blocks 4102-4104 for each alert type. In block 4102, an average alert type, $Ave_i$, is computed for alert $AT_i$. In decision block 4103, when the average alert type $Ave_i > Th_{AT}$, where $Th_{AT}$ is an alert type threshold for identify high priority alerts (i.e., events), control flow to block 4104. In block 4104, the alert type $AT_i$ is tagged as high priority. In decision block 4105, the operations represented by blocks 4102-4104 are repeated for all N alert types.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated computer-implemented method for discovering incidents through clusters of alerts occurring with objects executing in a data center, the method comprising:
    getting alerts with start times in a sliding run-time window from an alerts database, each alert corresponding to a run-time event occurring with an object executing in the data center;
    detecting clusters of alerts in the sliding run-time window based on start times of the alerts and topological proximity of objects, each cluster of alerts corresponding to an incident occurring with objects executing in the data center,
    determining high priority alerts in the clusters of alerts based on types of alerts; and
    displaying discovered incidents associated with the clusters of alerts, events associated with the clusters of alerts, and high priority events in a graphical user interface ("GUI").

2. The method of claim 1 further comprising:
    comparing run-time metric values of metrics of the data center to corresponding thresholds;
    detecting run-time violations of the corresponding thresholds; and
    recording alerts associate with each of the run-time violations in the alerts database.

3. The method of claim 1 further comprising:
    determining incident descriptions of the alerts of the clusters of alerts based on a hierarchy of the objects in a topological hierarchy of the data center; and
    displaying the incident descriptions in the GUI.

4. The method of claim 1 wherein detecting clusters of alerts in the sliding run-time window comprises:
    partitioning the sliding run-time window into four equal duration time intervals, including an earliest interval, a second earliest interval, a third earliest interval, and a fourth earliest interval;
    detecting core alerts with start times in a second earliest interval of the time intervals based on time and topological proximity of alerts in the second earliest interval;
    assigning cluster identification ("ID") to each core alert in the second earliest interval;
    assigning cluster IDs of core alerts to border alerts in the earliest interval, based on the border alerts lying with neighborhoods of the core alerts;
    detecting border alerts in the second earliest interval; and
    advancing the sliding run-time window by the duration of the time intervals.

5. The method of claim 4 wherein assigning cluster identification ("ID") to each core alert in the second earliest interval comprises:
    for each core alert,
        in response to the core alert having two or more core alerts with different cluster IDs, assigning to the core alert the cluster ID of the cluster with a largest number core alerts,
        in response to the core alert having a core alert with a cluster ID, assigning to the core alert the cluster ID, and
        assigning the core alert a new cluster ID when the core alert does not contain a core alert with a cluster ID.

6. The method of claim 1 wherein determining priorities of the alerts in the clusters of alerts based on alert types.

7. The method of claim 1 further comprising:
    sorting alerts based on start time recorded in a historical time interval;
    identifying an alert as corresponding to an incident; and
    for each subsequent alert,
    determining whether the alert is in time and topological proximity with each alert in a cluster of alerts associated with the incident,
    adding the alert to the cluster of alerts in response to the alert being in time and topological proximity with each of the alerts in the cluster, and
    stating a new incident for the alert in response to the alert not being in time and topological proximity with each of the alerts in the cluster.

8. The method of claim 1 further comprising:
    for each alert recorded in a historical time period, determining a number of alerts that are within a neighborhood of the alert:
    forming a first cluster of alerts from the alerts that are within a neighborhood with the largest number of alerts; and
    forming a second cluster of alerts from the alerts that are within a neighborhood with the second largest number of alerts and excluded alerts in the first cluster of alerts.

9. A computer system for discovering incidents through clusters of alerts occurring with objects executing in a data center, the computer system comprising:
one or more processors;
one or more data-storage devices; and
machine-readable instructions stored in the one or more data-storage devices that when executed using the one or more processors control the system to performance operations comprising:
getting alerts with start times in a sliding run-time window from an alerts database, each alert corresponding to a run-time event occurring with an object executing in the data center;
detecting clusters of alerts in the sliding run-time window based on start times of the alerts and topological proximity of objects, each cluster of alerts corresponding to an incident occurring with objects executing in the data center;
determining high priority alerts in the clusters of alerts based on types of alerts; and
displaying discovered incidents associated with the clusters of alerts, events associated with the clusters of alerts, and high priority events in a graphical user interface ("GUI").

10. The computer system of claim 9 further comprising:
comparing run-time metric values of metrics of the data center to corresponding thresholds;
detecting run-time violations of the corresponding thresholds; and
recording alerts associate with each of the run-time violations in the alerts database.

11. The computer system of claim 9 further comprising:
determining incident descriptions of the alerts of the clusters of alerts based on a hierarchy of the objects in a topological hierarchy of the data center; and
displaying the incident descriptions in the GUI.

12. The computer system of claim 9 wherein detecting clusters of alerts in the sliding run-time window comprises:
partitioning the sliding run-time window into four equal duration time intervals, including an earliest interval, a second earliest interval, a third earliest interval, and a fourth earliest interval;
detecting core alerts with start times in a second earliest interval of the time intervals based on time and topological proximity of alerts in the second earliest interval;
assigning cluster identification ("ID") to each core alert in the second earliest interval;
assigning cluster IDs of core alerts to border alerts in the earliest interval, based on the border alerts lying with neighborhoods of the core alerts;
detecting border alerts in the second earliest interval; and
advancing the sliding run-time window by the duration of the time intervals.

13. The computer system of claim 12 wherein assigning cluster identification ("ID") to each core alert in the second earliest interval comprises:
for each core alert,
in response to the core alert having two or more core alerts with different cluster IDs, assigning to the core alert the cluster ID of the cluster with a largest number core alerts,
in response to the core alert having a core alert with a cluster ID, assigning to the core alert the cluster ID, and
assigning the core alert a new cluster ID when the core alert does not contain a core alert with a cluster ID.

14. The computer system of claim 9 wherein determining priorities of the alerts in the clusters of alerts based on alert types.

15. The computer system of claim 9 further comprising:
sorting alerts based on start time recorded in a historical time interval;
identifying an alert as corresponding to an incident; and
for each subsequent alert,
determining whether the alert is in time and topological proximity with each alert in a cluster of alerts associated with the incident,
adding the alert to the cluster of alerts in response to the alert being in time and topological proximity with each of the alerts in the cluster, and
stating a new incident for the alert in response to the alert not being in time and topological proximity with each of the alerts in the cluster.

16. The computer system of claim 9 further comprising:
for each alert recorded in a historical time period, determining a number of alerts that are within a neighborhood of the alert;
forming a first cluster of alerts from the alerts that are within a neighborhood with the largest number of alerts; and
forming a second cluster of alerts from the alerts that are within a neighborhood with the second largest number of alerts and excluded alerts in the first cluster of alerts.

17. A non-transitory computer-readable medium having instructions encoded thereon for enabling one or more processors of a computer system to perform operations comprising:
getting alerts with start times in a sliding run-time window from an alerts database, each alert corresponding to a run-time event occurring with an object executing in the data center;
detecting clusters of alerts in the sliding run-time window based on start times of the alerts and topological proximity of objects, each cluster of alerts corresponding to an incident occurring with objects executing in the data center;
determining high priority alerts in the clusters of alerts based on types of alerts; and
displaying discovered incidents associated with the clusters of alerts, events associated with the clusters of alerts, and high priority events in a graphical user interface ("GUI").

18. The medium of claim 17 further comprising:
comparing run-time metric values of metrics of the data center to corresponding thresholds;
detecting run-time violations of the corresponding thresholds; and
recording alerts associate with each of the run-time violations in the alerts database.

19. The medium of claim 17 further comprising:
determining incident descriptions of the alerts of the clusters of alerts based on a hierarchy of the objects in a topological hierarchy of the data center; and
displaying the incident descriptions in the GUI.

20. The medium of claim 17 wherein detecting clusters of alerts in the sliding run-time window comprises:
partitioning the sliding run-time window into four equal duration time intervals, including an earliest interval, a second earliest interval, a third earliest interval, and a fourth earliest interval;

detecting core alerts with start times in a second earliest interval of the time intervals based on time and topological proximity of alerts in the second earliest interval;

assigning cluster identification ("ID") to each core alert in the second earliest interval;

assigning cluster IDs of core alerts to border alerts in the earliest interval, based on the border alerts lying with neighborhoods of the core alerts;

detecting border alerts in the second earliest interval; and advancing the sliding run-time window by the duration of the time intervals.

21. The medium of claim 20 wherein assigning cluster identification ("ID") to each core alert in the second earliest interval comprises:

for each core alert,
in response to the core alert having two or more core alerts with different cluster IDs, assigning to the core alert the cluster ID of the cluster with a largest number core alerts,
in response to the core alert having a core alert with a cluster ID, assigning to the core alert the cluster ID, and
assigning the core alert a new cluster ID when the core alert does not contain a core alert with a cluster ID.

22. The medium of claim 17 wherein determining priorities of the alerts in the clusters of alerts based on alert types.

23. The medium of claim 17 further comprising discovering clusters of alerts using time evolution clustering based on the start times of the alerts and the topological proximity of the objects.

24. The medium of claim 17 further comprising discovering clusters of alerts using coverage evolution of alerts based on the start times of the alerts and the topological proximity of the objects.

25. The medium of claim 17 further comprising:

sorting alerts based on start time recorded in a historical time interval;

identifying an alert as corresponding to an incident; and for each subsequent alert,
determining whether the alert is in time and topological proximity with each alert in a cluster of alerts associated with the incident,
adding the alert to the cluster of alerts in response to the alert being in time and topological proximity with each of the alerts in the cluster, and
stating a new incident for the alert in response to the alert not being in time and topological proximity with each of the alerts in the cluster.

26. The medium of claim 17 further comprising:

for each alert recorded in a historical time period, determining a number of alerts that are within a neighborhood of the alert;

forming a first cluster of alerts from the alerts that are within a neighborhood with the largest number of alerts; and forming a second cluster of alerts from the alerts that are within a neighborhood with the second largest number of alerts and excluded alerts in the first cluster of alerts.

* * * * *